United States Patent
Barinov

(10) Patent No.: US 10,021,003 B2
(45) Date of Patent: *Jul. 10, 2018

(54) DISTRIBUTED AGGREGATION FOR CONTACT CENTER AGENT-GROUPS ON SLIDING INTERVAL

(71) Applicant: Genesys Telecommunications Laboratories, Inc., Daly City, CA (US)

(72) Inventor: Vitaly Y. Barinov, Clayton, CA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/294,670

(22) Filed: Oct. 14, 2016

(65) Prior Publication Data

US 2017/0141979 A1 May 18, 2017

Related U.S. Application Data

(63) Continuation of application No. 13/682,679, filed on Nov. 20, 2012, now Pat. No. 9,477,464.

(51) Int. Cl.
*H04L 12/26* (2006.01)
*H04L 12/24* (2006.01)

(52) U.S. Cl.
CPC .......... *H04L 43/067* (2013.01); *H04L 41/046* (2013.01); *H04L 43/02* (2013.01)

(58) Field of Classification Search
CPC .... G06F 17/30516; G06F 11/079; G06F 9/50; G06F 11/0709; G06F 17/30;
(Continued)

(56) References Cited

U.S. PATENT DOCUMENTS

| 5,937,051 A | 8/1999 | Hurd et al. |
| 6,021,428 A | 2/2000 | Miloslavsky |

(Continued)

FOREIGN PATENT DOCUMENTS

EP 2306381 A1 4/2011

OTHER PUBLICATIONS

Abadi, Daniel, "Problems with CAP, and Yahoo's little known NoSQL system", http://dbmsmusings.blogspot.com/2010/04/problems-with-cap-and-yahoos-little.html, (4 pages).
(Continued)

*Primary Examiner* — Ninos Donabed
(74) *Attorney, Agent, or Firm* — Lewis Roca Rothgerber Christie LLP

(57) ABSTRACT

A method for aggregating and reporting data from a plurality of data sources in a contact center is provided. The method includes: maintaining by a computer device aggregated data for a sliding interval including N+1 contiguous panes ordered from 0 to N, where N is greater or equal to 1; updating by the computer device the aggregated data for the sliding interval based on updates for the sliding interval received from one or more of the data sources; monitoring for expiration of one of the panes; and in response to determining that the one of the panes has expired, reporting the aggregated data for the sliding interval to a client.

19 Claims, 11 Drawing Sheets

(58) Field of Classification Search
CPC . G06F 17/30445; H04L 43/08; H04L 1/1614; H04L 63/1458; H04L 43/0852; H04L 43/106; H04L 47/70; H04L 63/1408; H04W 72/0446; H04W 76/023; G06Q 30/08

See application file for complete search history.

(56) References Cited

U.S. PATENT DOCUMENTS

| | | |
|---|---|---|
| 6,055,308 A | 4/2000 | Miloslavsky et al. |
| 6,134,315 A | 10/2000 | Galvin |
| 6,377,567 B1 | 4/2002 | Leonard |
| 6,393,472 B1 | 5/2002 | Anerousis et al. |
| 6,404,883 B1 | 6/2002 | Hartmeier |
| 6,625,139 B2 | 9/2003 | Miloslavsky et al. |
| 6,650,748 B1 | 11/2003 | Edwards et al. |
| 6,834,303 B1 | 12/2004 | Garg et al. |
| 6,868,152 B2 | 3/2005 | Statham et al. |
| 6,879,586 B2 | 4/2005 | Miloslavsky et al. |
| 6,985,943 B2 | 1/2006 | Deryugin et al. |
| 7,376,227 B2 | 5/2008 | Anisimov et al. |
| 7,490,145 B2 | 2/2009 | Sylor et al. |
| 7,526,540 B2 | 4/2009 | Gopisetty et al. |
| 7,602,725 B2 | 10/2009 | Vaught |
| 7,701,925 B1 | 4/2010 | Mason et al. |
| 7,817,796 B1 | 10/2010 | Clippinger et al. |
| 7,936,867 B1 | 5/2011 | Hill et al. |
| 8,023,637 B2 | 9/2011 | Irwin et al. |
| 8,031,860 B2 | 10/2011 | Coussement |
| 8,146,000 B1 | 3/2012 | Boliek et al. |
| 8,391,463 B1 | 3/2013 | Kiefhaber et al. |
| 8,510,807 B1 | 8/2013 | Elazary et al. |
| 8,588,398 B1 | 11/2013 | Irwin et al. |
| 8,594,306 B2 | 11/2013 | Laredo et al. |
| 8,630,399 B2 | 1/2014 | D'Arcy et al. |
| 8,634,541 B2 | 1/2014 | Flockhart et al. |
| 8,675,859 B2 | 3/2014 | Mandalia et al. |
| 8,701,128 B2 | 4/2014 | Salt et al. |
| 8,719,067 B2 | 5/2014 | Fama et al. |
| 8,792,633 B2 | 7/2014 | Barinov |
| 2002/0046273 A1 | 4/2002 | Lahr et al. |
| 2002/0095462 A1 | 7/2002 | Beck et al. |
| 2002/0110113 A1 | 8/2002 | Wengrovitz |
| 2002/0156599 A1 | 10/2002 | Oosthoek et al. |
| 2003/0018702 A1 | 1/2003 | Broughton et al. |
| 2003/0115317 A1 | 6/2003 | Hickson et al. |
| 2003/0198183 A1 | 10/2003 | Henriques et al. |
| 2004/0028212 A1 | 2/2004 | Lok et al. |
| 2004/0044585 A1 | 3/2004 | Franco |
| 2004/0088315 A1 | 5/2004 | Elder et al. |
| 2004/0252822 A1* | 12/2004 | Statham ............... H04M 3/22 379/265.02 |
| 2005/0154637 A1 | 7/2005 | Nair et al. |
| 2005/0210262 A1 | 9/2005 | Rolia et al. |
| 2006/0133428 A1* | 6/2006 | Guthrie ............... H04L 43/0858 370/519 |
| 2006/0159027 A1 | 7/2006 | Owens |
| 2006/0195599 A1 | 8/2006 | Gedik et al. |
| 2007/0226239 A1 | 9/2007 | Johnson et al. |
| 2008/0077470 A1 | 3/2008 | Yamanaka |
| 2008/0225804 A1 | 9/2008 | Thubert et al. |
| 2009/0271529 A1* | 10/2009 | Kashiyama ....... G06F 17/30477 710/1 |
| 2009/0316687 A1 | 12/2009 | Kruppa |
| 2010/0002863 A1 | 1/2010 | Loftus et al. |
| 2010/0020689 A1 | 1/2010 | Tang |
| 2010/0106710 A1* | 4/2010 | Nishizawa ........ G06F 17/30516 707/714 |
| 2010/0250566 A1 | 9/2010 | Paul |
| 2010/0284282 A1* | 11/2010 | Golic ................... H04L 43/022 370/242 |
| 2010/0293532 A1 | 11/2010 | Andrade et al. |
| 2010/0316116 A1 | 12/2010 | Iler |
| 2011/0019562 A1* | 1/2011 | Cattuto ................ G01S 5/0252 370/252 |
| 2011/0055122 A1 | 3/2011 | Andreoli |
| 2011/0119761 A1 | 5/2011 | Wang et al. |
| 2011/0227754 A1 | 9/2011 | Hill |
| 2011/0254732 A1 | 10/2011 | Martin et al. |
| 2011/0260884 A1 | 10/2011 | Yi et al. |
| 2011/0283000 A1 | 11/2011 | McCormack et al. |
| 2012/0079061 A1 | 3/2012 | Krebs |
| 2012/0158995 A1 | 6/2012 | McNamee et al. |
| 2013/0050199 A1 | 2/2013 | Chavez |
| 2013/0204959 A1 | 8/2013 | Zhang et al. |
| 2013/0290367 A1 | 10/2013 | Kashiyama |
| 2014/0126711 A1 | 5/2014 | Barinov |
| 2014/0126713 A1 | 5/2014 | Ristock et al. |
| 2014/0129617 A1 | 5/2014 | Barinov |
| 2014/0143373 A1 | 5/2014 | Vitaly |
| 2014/0294169 A1 | 10/2014 | Barinov |

OTHER PUBLICATIONS

Anisimov, Nikolay et al., XML Based Framework for Contact Center Applications; WEBIST 2007—International Conference on Web Information Systems and Technologies, 2007, 8 pages.

Arasu, A., Widom, J. "Resource Sharing in Continuous Sliding-Window Aggregates", Proceedings of the 30th VLBD Confernece, Toronto, Canada 2004, (24 pages).

Birman, Kenneth P. et al., Exploiting Virtual Synchrony in Distributed Systems, Cornell University, ACM, 1987, pp. 123-138.

Cormode, G., et al., "Brief Announcement: Tracking Distributed Aggregates over Time-based Sliding Windows", PODC'11, Jun. 6-8, 2011, San Jose, California, USA, ACM 978-1-4503-0719-2/11/06, (2 pages).

Gilbert, S., and Lynch, N., "Brewer's Conjecture and the Feasibility of Consistent, Available, Partition-Tolerant Web Services", ACM SIGACT News, vol. 33 Issue 2 (2002), 51-59 (12 pages).

Han, J. and Kamber, M. "Data Mining: Concepts and Techniques", 2nd Edition., Morgan Kaufmann Publishers, Mar. 2006, (136 pages).

Hypergraph—Wikipedia, http://en.wikipedia.org/wiki/Hypergraph, as captured on Mar. 29, 2013, 8 pages.

International Search Report and Written Opinion for PCT/US2013/071104, dated Feb. 27, 2014, 12 pages.

Karypis, G., et al., Multilevel Hypergraph Partitioning: Applications in VLSI Domain, IEEE Transactions on Very Large Scale Integration (VLSI) Systems, vol. 7, No. 1, Mar. 1999, pp. 69-79.

Lamport, Leslie, "Paxos Made Simple", ACM SIGACT News (Distributed ComputingColumn) 32, 4 (Whole No. 121, Dec. 2001), pp. 51-58 (14 pages).

Li, J et al., "No Pane, No Gain: Efficient Evaluation of Sliding-Window Aggregates over Data Streams", SIGMOD Record, vol. 34, No. 1, Mar. 2005, pp. 39-44 (6 pages).

Madden, S. et al. "TAG: a Tiny AGgregation Service for Ad-Hoc Sensor Networks", ACM SIGOPS Operating Systems Review—OSDI '02: Proceedings of the 5th symposium on Operating systems design and implementation, vol. 36 Issue SI, Winter 2002, 131-146 (16 pages).

Tanenbaum, Andrew S., Computer Networks, Fourth Edition, 2003, Prentice Hall PTR, 4 pages.

Zoltan Developer's Guide: Quality Program; Zoltan Toolkit, http://www.cs.sandia.gov/zoltan/dev_html/dev_intro_sqe._html, as captured on Mar. 29, 2013, 6 pages.

* cited by examiner

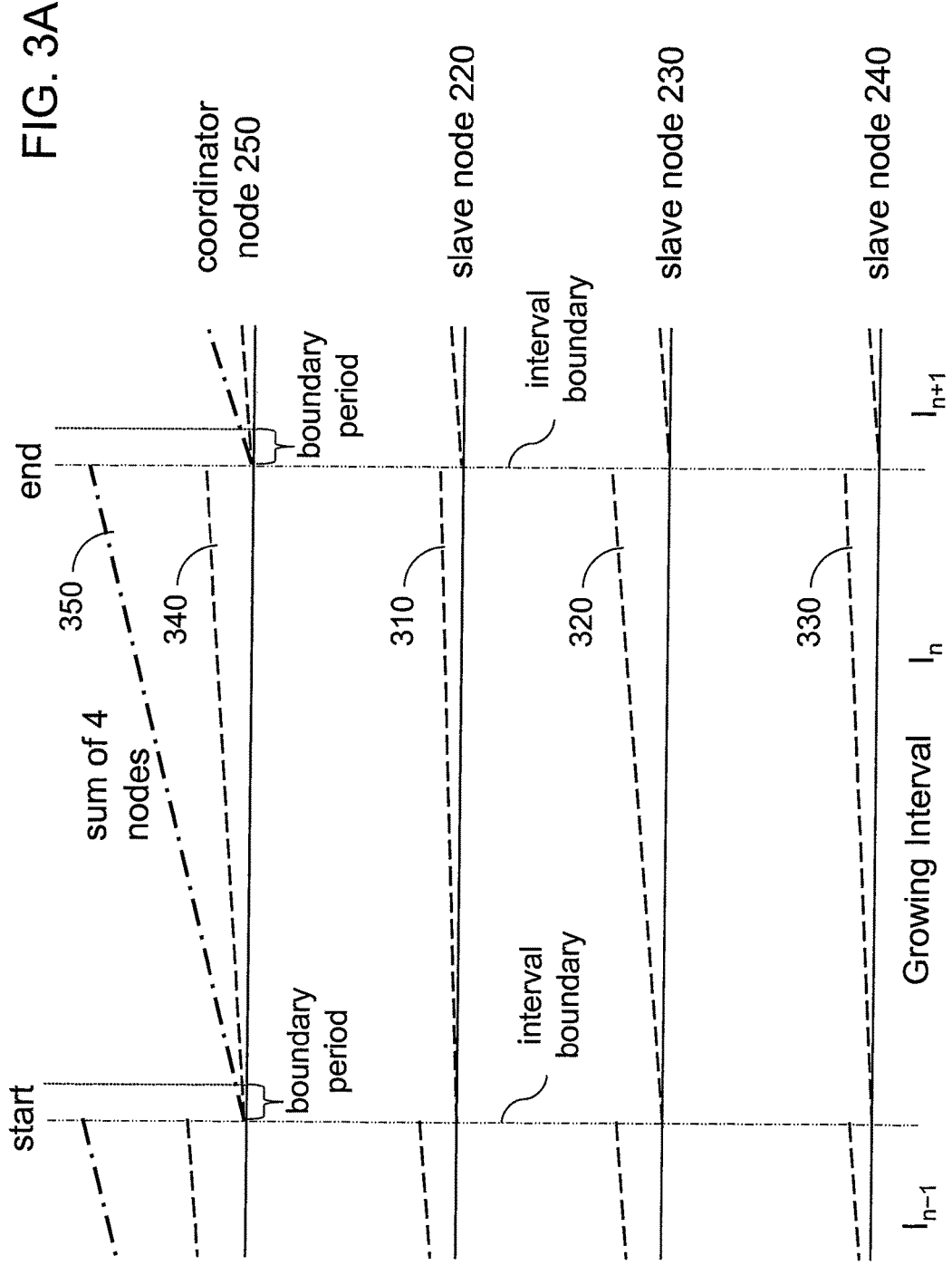

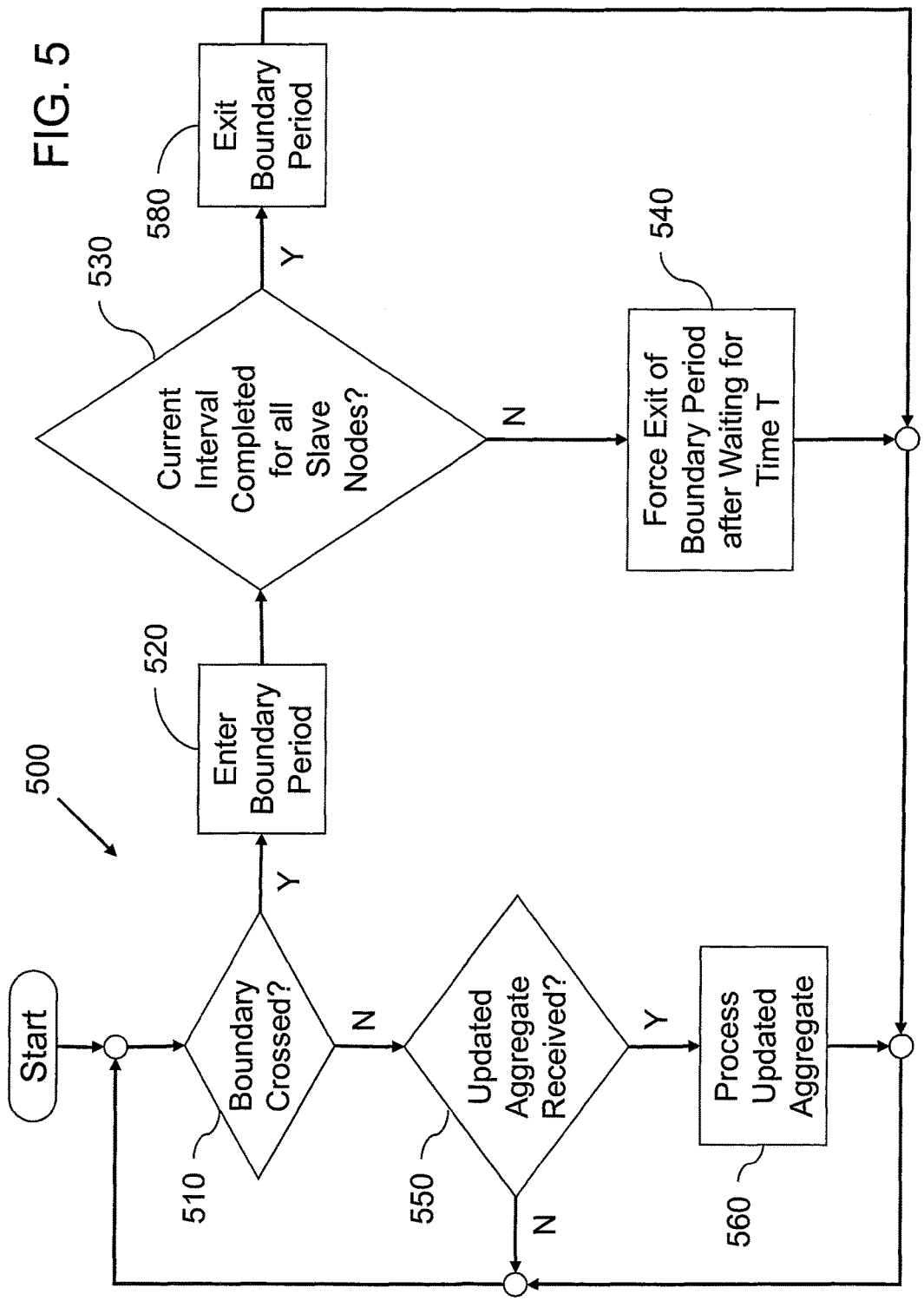

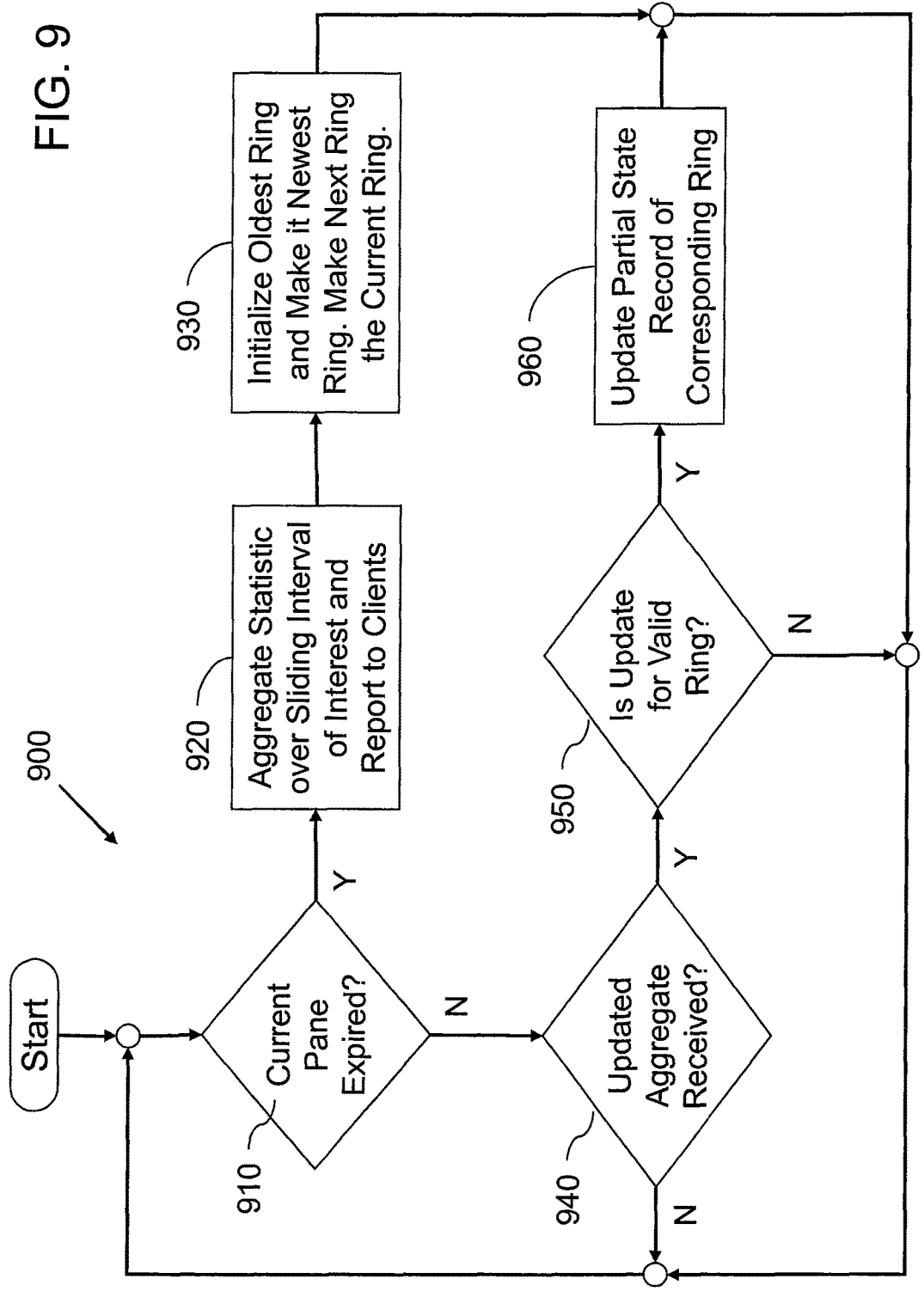

DISTRIBUTED AGGREGATION FOR CONTACT CENTER AGENT-GROUPS ON SLIDING INTERVAL

CROSS-REFERENCE TO RELATED APPLICATIONS

This application is a continuation of U.S. patent application Ser. No. 13/682,679, filed on Nov. 20, 2016, now U.S. Pat. No. 9,477,464, the disclosure of which is hereby incorporated by reference in its entirety.

FIELD

Aspects of embodiments of the present invention relate to systems and methods of processing large amounts of data in real time using distributed aggregation algorithms, and more specifically, to processing the data for contact center agent groups.

BACKGROUND

There is a rapidly growing need to process large amounts of data in real-time in such areas as telecommunications, finance, etc. For example, in customer contact centers, agent-groups can be large, each divided into several subsets of agents with statistics being acquired for each subset and then aggregated for the entire agent group. The statistics across multiple subsets of agents may need to be continuously tracked and updated. This real-time computing processing can present challenges to system designers, for example, in providing up-to-the minute statistical data that is both timely and accurate.

SUMMARY

Embodiments of the present invention are directed to systems and methods of processing large amounts of data in real time using distributed aggregation algorithms. Further embodiments of the present invention are directed to systems and methods of processing large amounts of data in real time using distributed aggregation algorithms on a growing interval. Still further embodiments of the present invention are directed to systems and methods of processing large amounts of data in real time using distributed aggregation algorithms on a sliding interval.

According to an exemplary embodiment of the present invention, a method for aggregating and reporting data from a plurality of data sources in a contact center is provided. The method includes: maintaining by a computer device aggregated data for a sliding interval including N+1 contiguous panes ordered from 0 to N, where N is greater or equal to 1; updating by the computer device the aggregated data for the sliding interval based on updates for the sliding interval received from one or more of the data sources; monitoring for expiration of one of the panes; and in response to determining that the one of the panes has expired, reporting the aggregated data for the sliding interval to a client.

The one of the panes may be the Nth pane.

The contiguous panes may further include D contiguous panes ordered from N+1 to N+D, where D is greater than or equal to 1. The maintaining of the aggregated data for the sliding interval may further include maintaining aggregated data for additional sliding intervals of N+1 contiguous panes ordered from I to I+N for each I between 1 and D. The one of the panes may be the (N+D)th pane.

The method may further include dividing each of the sliding interval and the additional sliding intervals into R+1 contiguous rings ordered from 0 to R, each of the rings including G+1 of the panes, where R and G are each greater than or equal to 1, and $N+1=(R+1)\times(G+1)$.

Each of the updates may include a partial aggregate of the data representing one of the rings.

The maintaining of the aggregated data for the sliding interval and the additional sliding intervals may include maintaining the aggregated data for each of the rings.

The method may further include dividing the sliding interval into R+1 contiguous rings ordered from 0 to R, each of the rings including G+1 of the panes, where R and G are each greater than or equal to 1, and $N+1=(R+1)\times(G+1)$.

The G+1 of the panes may include G+1 contiguous ones of the panes ordered from M to M+G for some value of M between 0 and N-G.

Each of the updates may include a partial aggregate of the data representing one of the rings.

The maintaining of the aggregated data for the sliding interval may include maintaining the aggregated data for each of the rings.

According to another exemplary embodiment of the present invention, a system is provided. The system includes a computer device, a plurality of slave data aggregation nodes on the computer device and configured to aggregate first data from a plurality of data sources in a contact center to produce second data, and a coordinator data aggregation node on the computer device and configured to aggregate the second data from the slave data aggregation nodes to produce third data. The coordinator data aggregation node is further configured to: maintain the third data for a sliding interval comprising N+1 contiguous panes ordered from 0 to N, where N is greater or equal to 1; update the third data for the sliding interval based on the second data for the sliding interval received from the slave data aggregation nodes; monitor for expiration of one of the panes; and in response to determining that the one of the panes has expired, report the third data for the sliding interval to a client.

The one of the panes may be the Nth pane.

The contiguous panes may further include D contiguous panes ordered from N+1 to N+D, where D is greater than or equal to 1. The coordinator data aggregation node may be further configured to maintain the third data for additional sliding intervals of N+1 contiguous panes ordered from I to I+N for each I between 1 and D. The one of the panes may be the (N+D)th pane.

The coordinator data aggregation node may be further configured to divide each of the sliding interval and the additional sliding intervals into R+1 contiguous rings ordered from 0 to R, each of the rings comprising G+1 of the panes, where R and G are each greater than or equal to 1, and $N+1=(R+1)\times(G+1)$.

Each of the second data may include aggregated said first data representing one of the rings.

The coordinator data aggregation node may be further configured to maintain the third data for each of the rings.

The coordinator data aggregation node may be further configured to divide the sliding interval into R+1 contiguous rings ordered from 0 to R, each of the rings comprising G+1 of the panes, where R and G are each greater than or equal to 1, and $N+1=(R+1)\times(G+1)$.

The G+1 of the panes may include G+1 contiguous ones of the panes ordered from M to M+G for some value of M between 0 and N-G.

Each of the second data may include aggregated said first data representing one of the rings.

The coordinator data aggregation node may be further configured to maintain the third data for each of the rings.

BRIEF DESCRIPTION OF THE DRAWINGS

The accompanying drawings, together with the specification, illustrate exemplary embodiments of the present invention. These drawings, together with the description, serve to better explain aspects and principles of the present invention.

FIG. 3A is a graphical representation of the aggregation of a statistic over a growing interval across one coordinator node and three slave nodes, according to an embodiment of the present invention.

FIG. 5 is a flowchart of a process executed by the coordinator node for processing the distributed aggregation statistic on the growing interval according to an exemplary embodiment of the present invention.

FIG. 9 is a flowchart of a process executed by the coordinator node for processing the distributed aggregation statistic on the sliding interval according to an exemplary embodiment of the present invention.

DETAILED DESCRIPTION

Figure 1:
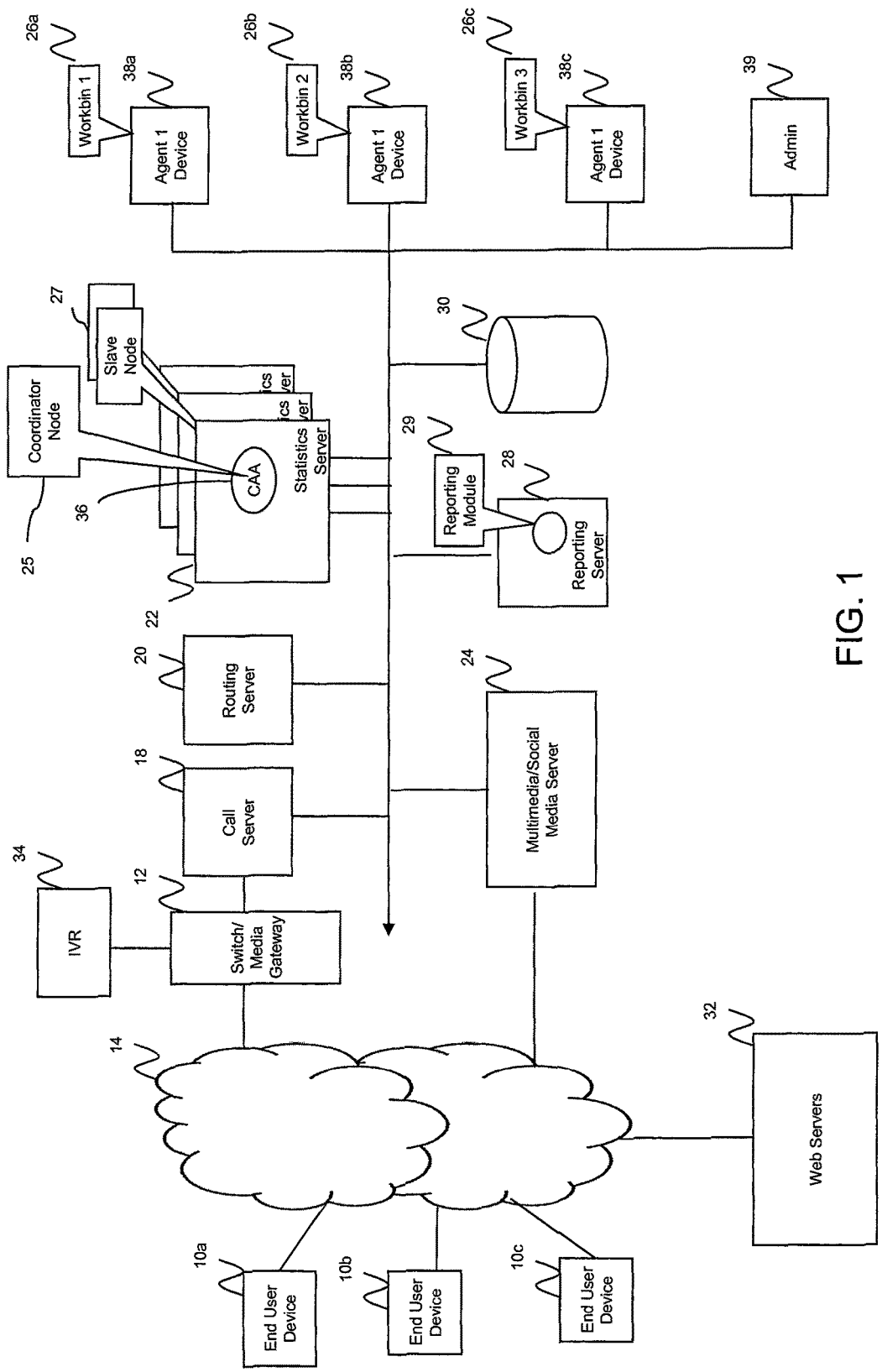
FIG. 1 is a schematic block diagram of a system supporting a contact center that is configured to provide customer availability information to customer service agents according to one exemplary embodiment of the invention.

Exemplary embodiments of the present invention will now be described with reference to the accompanying drawings.

Embodiments of the invention are directed to aggregating large amounts of data in a distributed computing environment, for example, a computing environment supporting a contact center. Certain statistics, hereinafter referred to as distributed aggregation statistics, are generated and aggregated (e.g., accumulated) over, for example, an entire contact center. Examples of distributed aggregation statistics include COUNT (incrementing a counter), SUM (computing a sum), MIN (returning the minimum value), and MAX (returning the maximum value). A single node in charge of this aggregation may get overwhelmed if, for example, it has too many data sources to manage, or it receives too many updates in a small period of time. Accordingly, the management of such statistics can be partitioned into a set of partial aggregates, each partial aggregate being assigned to a different node (e.g., a slave node). The partial aggregates can then be combined into a final aggregate at a single node (e.g. a coordinator node), without overwhelming the coordinator node with too many data sources to manage, or with too many updates to perform in a small period of time.

Contact centers may want to track numerous statistics, for example, statistics related to agent performance and contact center activity. Many of these statistics are distributed aggregation statistics, such as the number of calls handled by the agents. Such statistics are frequently monitored on a growing interval, that is, a period of time, such as 24 hours, that may have a set starting point and ending point (for example, a predefined starting point and ending point). The interval may be reset at a particular time (such as every midnight), depending on factors such as the requirements of clients interested in the statistics, or the length of time of the interval. The intervals can be short (such as 5 minutes), or long (such as 24 hours). They may also vary in length (for example, according to a schedule, such as a predefined schedule, or stopping and starting at the request of an outside source, such as an administrator or client). According to one exemplary embodiment, a continuous aggregation (like a steady sum) taking place since a previous reset point may be referred to as a growing interval. After a reset point, which will hereinafter also be referred to as a boundary, a new interval begins.

A boundary thus demarks a period of time (for example, a fixed period of time) when two intervals (referred to hereinafter as a current interval and a next interval) may be actively processed. This period of time will hereinafter be referred to as a boundary period. For the sake of simplicity, the boundary period will be described as being much smaller than the interval length. Between the end of the boundary period and the next boundary, only one interval is being actively processed (referred to hereinafter as the current interval).

For other such statistics, it may be desired to monitor them on a sliding interval (also referred to as a sliding window or window), for example, the last 24 hours. According to one exemplary embodiment, a sliding window represents a fixed amount of time W (such as five minutes or 24 hours) relative to a current time. A sliding interval statistic according to this exemplary embodiment thus represents the same amount of time (a window size) at any point, as opposed to a growing interval statistic, which represents a growing amount of time until a next interval boundary. That is, a sliding interval has a start time and an end time that slide, as opposed to a growing interval, which has a fixed start time and continues to grow until it reaches its end time. Unlike a growing interval, a sliding interval may not have a reset time (such as a fixed reset time). According to one exemplary embodiment, a continuous aggregation (like a steady sum) taking place over the last period of time W may be referred to as a sliding interval.

According to one exemplary embodiment, each event contributing to the aggregation is collected as a separate tuple, which may include information such as an individual event (such as a call, or the number of minutes for a call) and a time stamp of when the event took place. The tuples may then be aggregated at a central place, and sliding window statistics computed by aggregating the tuples over the desired sliding window period into one final aggregate. The number of tuples, however, is potentially boundless which may lead to scaling problems for both the storage of the tuples as well as the corresponding aggregation calculations. Maintaining a continuously updated sliding interval statistic over perhaps thousands of agents in a contact center using a pure tuple-based approach may thus represent a computationally impractical or infeasible task.

One practical alternative to pure tuples for sliding interval aggregation statistics is to break up a sliding interval (window) into a fixed set of N nonoverlapping contiguous panes, each of the N panes having a starting time and ending time (much like a growing interval), the ending time of one pane coinciding with the starting time of a next pane. For instance, each pane may represent a period of time of length $P=W/N$, starting relative to a common starting point (such as every hour on the hour for the previous 24 hours, or every 5 seconds on each multiple of 5 seconds for the previous 5 minutes).

Statistics for individual panes may then be aggregated similar to aggregating over growing intervals (e.g., doing some aggregation at an individual node level, and some of the aggregation at a coordinator node level), while the statistic for the sliding interval may represent the aggregation of N consecutive such panes. For ease of description, sliding intervals are described as having a fixed length W (such as 24 hours), a fixed number N of nonoverlapping panes (such as 24), where each such pane represents the same amount $P=W/N$ of time, and starting on a multiple of the amount of time (such as every hour). The scope of the present invention, however, is not limited to these restrictions, and in some embodiments, these values may vary as would be apparent to one of ordinary skill in the art.

According to exemplary embodiments, a sliding interval has boundaries at the individual panes. Accordingly, sliding intervals are represented as N contiguous panes, with consecutive sliding intervals overlapping in N−1 of these panes. One sliding interval becomes a next sliding interval by dropping its oldest pane and adding a newest pane. Sliding intervals are thus amenable to queue-like data structures (e.g., matrices, circular lists, etc.) for managing their individual component panes. In addition, the pane size P of the sliding interval (e.g., the length of time of each pane, which represents how precisely the sliding interval represents the previous period of time W) may be adjusted by adjusting the number N of panes. For instance, doubling the number N of panes (such as 48 instead of 24) halves the pane size P (to, for example, 30 minutes) at the expense of potentially doubling the amount of storage needed to maintain the partial aggregates for the individual panes as well as potentially doubling the computation time to aggregate all the partial aggregates into a total aggregate over the entire sliding window. The granularity P can thus be adjusted depending on, for example, needs of a client or administrator for timeliness of data versus appropriate computing resources to maintain the granularity.

According to an exemplary embodiment, panes are grouped into rings, where each ring represents a group of G panes (for example, G consecutive panes, such as 6 consecutive panes). This allows a better balancing of the computational complexity of sliding interval aggregation statistics across multiple levels of nodes. According to this exemplary embodiment, the ring size R is G×P, and the number of rings M in a sliding window is W/R. This allows, for example, slave nodes to perform aggregation at the ring level by aggregating statistics over G consecutive panes representing one ring, while a coordinator node aggregates statistics over M consecutive rings representing one window. For ease of description, rings are described as if they contain G consecutive panes. As such, rings function much like small sliding intervals (having G panes instead of N panes), so analogous terms for describing sliding intervals are also used to describe rings.

Although exemplary embodiments are described as organizing consecutive panes into rings and consecutive rings into sliding intervals, design decisions such as the use of rings, their corresponding sizes, and whether they represent consecutive panes may vary between embodiments of the present invention. One alternative to rings representing contiguous panes is for rings to represent evenly spaced panes. For example, in one exemplary embodiment, each ring in a sliding window represents every Mth pane in the sliding window. Thus, there are still M rings in the sliding window, but their panes are interleaved across the sliding window. These rings can still be thought of as contiguous, in that the panes of the first ring (i.e., the 1st pane, the (M+1)th pane, the (2M+1)th, etc.) are still contiguous to the respective panes of the second ring (i.e., the 2nd pane, the (M+2)th pane, the (2M+2)th pane, etc.) and so on for the third and later rings. In addition, the extension of the above concepts to even further levels of grouping (i.e., beyond rings) within the sliding interval is not expressly discussed herein, but would be apparent to one of ordinary skill in the art using similar principles used herein to describe panes and rings.

Clients, such as reporting programs, monitor these growing interval and sliding interval statistics, often in real time. As such, these statistics may need to have high availability, reflecting the most recent update. Thus, according to an exemplary embodiment of the present invention, a contact center statistic, such as the number of calls handled by an agent-group (i.e., a group of agents, perhaps thousands of agents), can be efficiently managed with high availability by partitioning the agent-group into several subsets of agents, each subset being assigned to and managed by a particular slave node. The slave nodes handle the updates for each of their corresponding agents, computing their own partial aggregates in the process. The slave nodes then send these partial aggregates to the coordinator node (that may also manage a subset of agents), which maintains a running aggregate for all the partial aggregates. According to one exemplary embodiment, the coordinator node is configured to report any updated aggregate of the statistic to interested clients with high availability.

However, in a growing interval, when an interval boundary is crossed, and one interval expires while another interval starts (that is, during the boundary period), the statistic may experience consistency issues (e.g., concurrently processing updates for both the current interval and the next interval). According to one exemplary embodiment, availability may be favored over consistency within the growing interval, and the updated aggregate may be reported to clients on every update, even if it means mixing partial aggregates whose corresponding data sources are not tightly synchronized. Once an interval completes (i.e., the boundary is crossed), the different agents, nodes, or the like finish processing the current interval, provide any final updates, and move onto the next interval (e.g., providing partial aggregates for this new interval).

Likewise, for a sliding interval, when a pane boundary is crossed, similar consistency issues may present themselves. The just-completed pane (or panes) may still have updates being reported to the coordinator node. Thus, while waiting to report such statistics improves the consistency (allowing straggling updates to reach the coordinator node), it does so at the expense of availability (e.g., the administrator or client interested in the sliding interval statistic may be reported values that do not reflect the latest updates).

To maintain consistency, the aggregate for the statistic is configured to reflect data from the same interval. The final aggregate for a growing interval (such as total customer call count for the day) is often an important value of the statistic but may not be fully accounted for until the boundary period. According to one exemplary embodiment, consistency is favored during the boundary period, and the reporting of the statistic to an interested client is withheld until all of the nodes have reported their final partial aggregates for the current interval and the coordinator node has had a chance to process them. During this boundary period, the aggregating of partial aggregates for the next interval starts. After reporting the final aggregate (i.e., after the boundary period), processing switches completely to the next interval (which becomes the new current interval), and the process repeats.

In a similar fashion, for a sliding interval statistic can have parameters, such as the pane size P and number of delay panes D, for controlling between consistency and availability. Setting the pane size small (such as a few seconds) improves the granularity of reporting, allowing the sliding window (as implemented by a fixed set of contiguous panes) to more accurately represent the period corresponding to the previous W amount of time. The number of delay panes D, in turn, represents a delay (in panes) between the most recent pane for which data has been collected and the most recent pane for reporting aggregated statistics over the sliding interval. When D=0, there is no delay (and thus, some panes, like the most recent pane, may not reflect all their updates), while for positive values of D, a corresponding amount of delay (such as 6 seconds, e.g., when the pane size P is 3 seconds and the number of delay panes D is 2) is built into the global aggregate to allow stray updates to make their way to the coordinator node.

FIG. 1 is a schematic block diagram of a system supporting a contact center that is configured to provide customer availability information to customer service agents according to one exemplary embodiment of the invention. The contact center may be an in-house facility to a business or corporation for serving the enterprise in performing the functions of sales and service relative to the products and services available through the enterprise. In another aspect, the contact center may be a third-party service provider. The contact center may be hosted in equipment dedicated to the enterprise or third party service provider, and/or hosted in a remote computing environment such as, for example, a private or public cloud environment with infrastructure for supporting multiple contact centers for multiple enterprises.

According to one exemplary embodiment, the contact center includes resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers) desiring to receive services from the contact center may initiate inbound calls to the contact center via their end user devices 10a-10c (collectively referenced as 10). Each of the end user devices 10 may be a communication device conventional in the art, such as, for example, a telephone, wireless phone, smart phone, personal computer, electronic tablet, and/or the like. Users operating the end user devices 10 may initiate, manage, and respond to telephone calls, emails, chats, text messaging, web-browsing sessions, and other multi-media transactions.

Inbound and outbound calls from and to the end users devices 10 may traverse a telephone, cellular, and/or data communication network 14 depending on the type of device that is being used. For example, the communications network 14 may include a private or public switched telephone network (PSTN), local area network (LAN), private wide area network (WAN), and/or public wide area network such as, for example, the Internet. The communications network 14 may also include a wireless carrier network including a code division multiple access (CDMA) network, global system for mobile communications (GSM) network, and/or any 3G or 4G network conventional in the art.

According to one exemplary embodiment, the contact center includes a switch/media gateway 12 coupled to the communications network 14 for receiving and transmitting calls between end users and the contact center. The switch/media gateway 12 may include a telephony switch configured to function as a central switch for agent level routing within the center. In this regard, the switch 12 may include an automatic call distributor, a private branch exchange (PBX), an IP-based software switch, and/or any other switch configured to receive Internet-sourced calls and/or telephone network-sourced calls. According to one exemplary embodiment of the invention, the switch is coupled to a call server 18 which may, for example, serve as an adapter or interface between the switch and the remainder of the routing, monitoring, and other call-handling systems of the contact center.

The contact center may also include a multimedia/social media server for engaging in media interactions other than voice interactions with the end user devices 10 and/or web servers 32. The media interactions may be related, for example, to email, vmail (voice mail through email), chat, video, text-messaging, web, social media, screen-sharing, and the like. The web servers 32 may include, for example, social interaction site hosts for a variety of known social interaction sites to which an end user may subscribe, such as, for example, Facebook, Twitter, and the like. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, the switch is coupled to an interactive voice response (IVR) server 34. The IVR server 34 is configured, for example, with an IVR script for querying customers on their needs. For example, a contact center for a bank may tell callers, via the IVR script, to "press 1" if they wish to get an account balance. If this is the case, through continued interaction with the IVR, customers may complete service without needing to speak with an agent.

If the call is to be routed to an agent, the call is forwarded to the call server 18 which interacts with a routing server 20 for finding the most appropriate agent for processing the call. The call server 18 may be configured to process PSTN calls, VoIP calls, and the like. For example, the call server 18 may include a session initiation protocol (SIP) server for processing SIP calls.

In one example, while an agent is being located and until such agent becomes available, the call server may place the call in, for example, a call queue. The call queue may be implemented via any data structure conventional in the art, such as, for example, a linked list, array, and/or the like. The data structure may be maintained, for example, in buffer memory provided by the call server 18.

Once an appropriate agent is available to handle a call, the call is removed from the call queue and transferred to a corresponding agent device 38a-38c (collectively referenced as 38). Collected information about the caller and/or the caller's historical information may also be provided to the agent device for aiding the agent in better servicing the call. In this regard, each agent device 38 may include a telephone adapted for regular telephone calls, VoIP calls, and the like. The agent device 38 may also include a computer for communicating with one or more servers of the contact center and performing data processing associated with contact center operations, and for interfacing with customers via a variety of communication mechanisms such as chat, instant messaging, voice calls, and the like.

The selection of an appropriate agent for routing an inbound call may be based, for example, on a routing strategy employed by the routing server 20, and further based on information about agent availability, skills, and other routing parameters provided, for example, by a statistics server 22 (or a plurality of statistics servers 22).

The system may also include one or more administrator devices (or administrator/agent devices) 39. The administrator device 39 may be configured to supervise the agent devices 38, make requests of the contact center, such as requests for statistics, and the like.

According to one exemplary embodiment, each of the plurality of statistics servers 22 includes a customer availability aggregation (CAA) module 36 (or aggregation module 36) for monitoring availability of end users on different communication channels and providing such information to, for example, the routing server 20, agent devices 38a-38c, and/or other contact center applications and devices. The CAA module may also be deployed in a separate application server. The aggregation module 36 may be a software module implemented via computer program instructions which are stored in memory of the statistics server 22, and which program instructions are executed by a processor. A person of skill in the art should recognize that the aggregation module 36 may also be implemented via firmware (e.g. an application-specific integrated circuit), hardware, or a combination of software, firmware, and hardware.

One such CAA module 36 in FIG. 1 is designated as a coordinator node 25. The coordinator node 25 is configured to aggregate statistics from one or more other CAA modules 36 designated as slave nodes 27. It should be noted that there does not need to be a one-to-one relationship between the nodes 25 and 27 and the statistics servers 22. For example, in one exemplary embodiment, the coordinator node 25 and the slave nodes 27 all reside on the same statistics server 22. In addition, the nodes 25 and 27 may be able to move between statistics servers 22.

According to one exemplary embodiment, the aggregation module 36 is configured to receive customer availability information from other devices in the contact center, such as, for example, the multimedia/social media server 24. For example, the multimedia/social media server 24 may be configured to detect user presence on different websites including social media sites, and provide such information to the aggregation module 36. The multimedia/social media server 24 may also be configured to monitor and track interactions on those websites.

The contact center may also include a reporting server 28 configured to generate reports from data aggregated by the statistics server 22. The reporting server 28 may include a reporting module 29 for performing this reporting. The reporting module 29 may be a software module implemented via computer program instructions which are stored in memory of the reporting server 28, and which program instructions are executed by a processor. The reports generated by the reporting module may include near real-time reports or historical reports concerning the state of resources, such as, for example, average waiting time, abandonment rate, agent occupancy, and the like. The reports may be generated automatically or in response to specific requests from a requestor, e.g., agent/administrator (such as from administrator device 39), contact center application, and/or the like.

According to one exemplary embodiment of the invention, the contact center also includes a mass storage device 30 for storing data related to contact center operations such as, for example, information related to agents, customers, customer interactions, and the like. The mass storage device may take the form of a hard disk or disk array as is conventional in the art. The data may be organized (for example, as a database) and managed by a separate server (such as a database server) as is known to one of ordinary skill in the art.

The various servers of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

Figure 2:
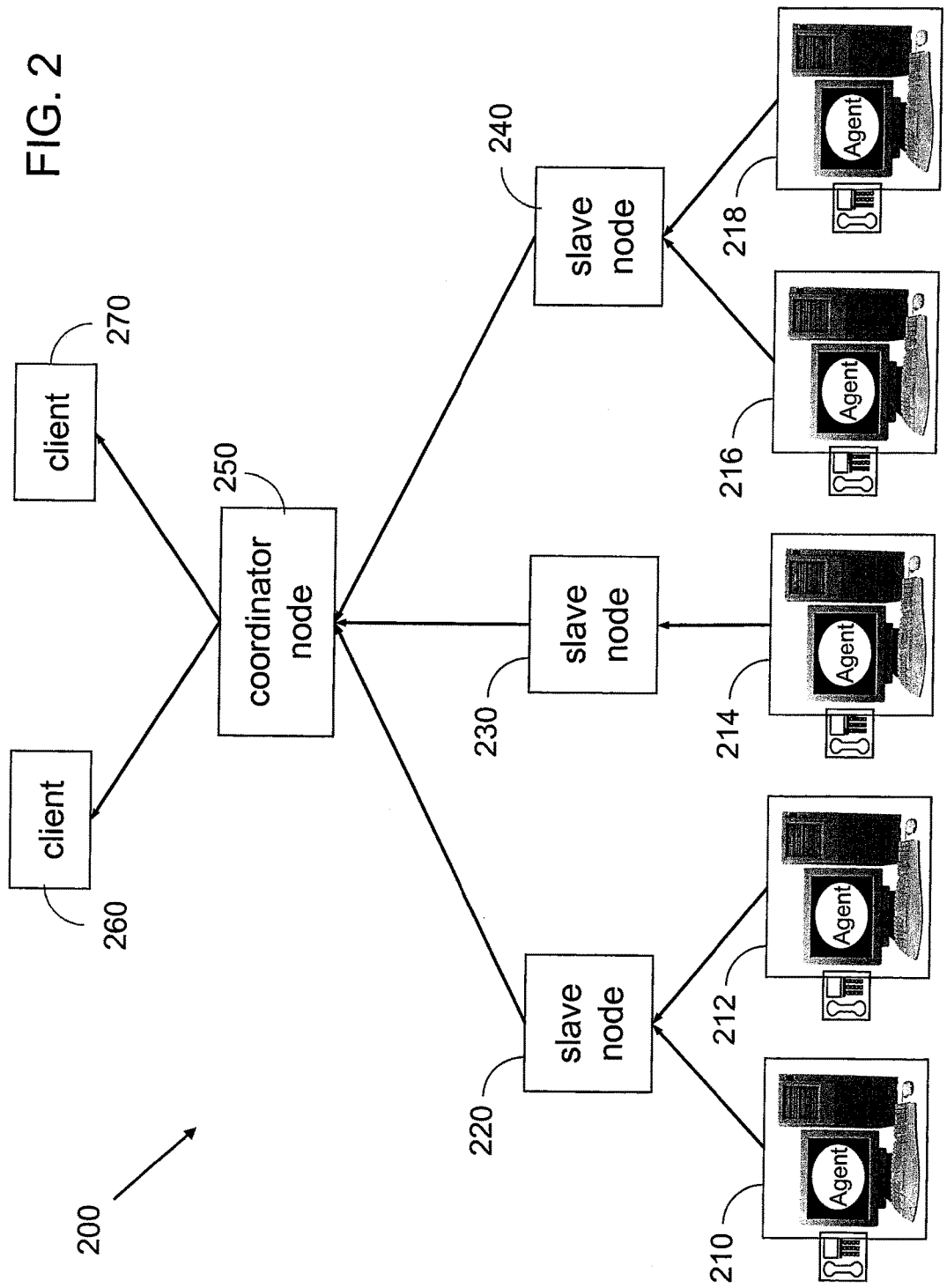
FIG. 2 is a block diagram of a logical arrangement of various entities involved in aggregating and reporting a distributed aggregation statistic for a contact center, according to an exemplary embodiment of the present invention.

FIG. 2 is a block diagram of a logical arrangement 200 of various entities involved in the aggregating and reporting of a distributed aggregation statistic for a contact center, according to an exemplary embodiment of the present invention.

In the exemplary arrangement 200, distributed aggregation statistics emanate from agents of the contact center, such as agents 210, 212, 214, 216, and 218, who may be part of a large agent-group. For example, one such distributed aggregation statistic is the number of calls handled by a particular agent. This statistic may be aggregated across the entire agent-group over, for example, a 24-hour period, at a coordinator node 250, which may be similar to the coordinator node 25 of FIG. 1. The coordinator node may be configured to report the running aggregate to interested clients 260 and 270 (such as the reporting modules 29 or administrators 39 of FIG. 1). If the client 260, 270 would like the statistic to have high availability, which reflects the most recent update to the statistic, the coordinator node 250 may recompute a running aggregate for each update received from one of the agents. However, since agent-groups can potentially get very large (e.g., thousands of agents), the coordinator node 250 can become a serial bottleneck if it has to maintain running aggregates of the statistic from each of the individual agents as well as report updated running aggregates to the interested clients 260, 270 every time one of the agents sends a new update.

In efforts to address the bottleneck issue, the agent group may be partitioned into nonoverlapping subsets of agents, and each of these subsets may be assigned to a particular slave node, such as slave nodes 220, 230, and 240, which may be similar to the slave nodes 27 of FIG. 1. The assignment may be based on a variety of factors, such as a relationship between the agents of a particular subset, an even balancing of agents or agent workloads across the subsets, or the like. In the example of FIG. 2, agents 210 and 212 are assigned to slave node 220, agent 214 is assigned to slave node 230, and agents 216 and 218 are assigned to slave node 240.

Each agent may keep track (e.g., a partial aggregate) of the statistic as it applies to the particular agent, and then send an update of the partial aggregate to a corresponding slave node, which will generally be referred to as slave node 220. It should be noted that the term "agent" in this context (and similar contexts in the present application) is also meant to encompass the agent's computer or other automated or electronic resources working on behalf of or dedicated to the agent. Rather than maintaining individual partial aggregates, however, in some embodiments, an agent reports any update to the statistic to its corresponding slave node 220.

Each slave node 220 in turn manages the updates from each of its assigned agents, and maintains a partial aggregate (e.g., a running partial aggregate) of the statistic over the entire subset of agents assigned to the slave node 220 for the current interval (in a growing interval statistic) or the current pane (in a sliding interval statistic). Upon receiving an update from one of its agents, the slave node 220, 230, 240 can update the partial aggregate for its subset of agents and forward this update to the coordinator node 250. Thus, for ease of description, in the embodiments described hereinafter, agents are not affected by intervals, panes, or boundaries, while slave nodes 220, 230, 240 switch quickly from one interval or pane to the next at the boundary. That is, in one exemplary embodiment, the slave nodes 220, 230, 240 maintain one partial aggregate for a growing interval statistic, reporting and resetting it soon after a boundary is crossed. For a sliding interval statistic, the slave nodes 220, 230, 240 maintain, according to one exemplary embodiment, G partial aggregates, one for each of G panes in a ring.

The coordinator node 250 may manage the partial aggregates (also referred to as partial state records, or PSRs) for the slave nodes 220, 230, 240, and/or the PSRs of rings or panes (for sliding interval statistics). In addition, the coordinator node 250 may also have a subset of individual agents assigned to it that it manages (similar to how the slave nodes 220, 230, 240 manage their subsets) in addition to managing the slave nodes 220, 230, 240. That is, the coordinator node 250 may have a dual role of both a slave node and a coordinator node for each of the slave nodes. Upon receiving an update from one of the slave nodes 220, the coordinator node 250 updates the running aggregate it maintains and may report the updated aggregate to the clients 260 and 270.

According to one exemplary embodiment, nodes (such as slave nodes 220, 230, and 240 as well as coordinator node 250) are logical entities, such as processes on a server. They communicate between themselves via, for example, a network (for distributed processes), or shared memory (for processes running on the same server), as is well known to one of ordinary skill. The choice of which node is a coordinator node and which nodes are slave nodes can vary between embodiments, and may be based on such factors as load balancing (for example, having each node be a coordinator node for one statistic, and be a slave node for each of the other statistics). According to one example, while the communications can be asynchronous, communications between the same pair of entities (such as between slave node 220 and the coordinator node 250) are assumed to be received in the order of sending (that is, monotonicity of sending is maintained).

While FIG. 2 shows a single level of slave nodes 220, 230, 240, in other embodiments, there may be multiple levels of slave nodes, hierarchically organized, as would be apparent to one of ordinary skill in the art. In such a configuration, the different levels of slave nodes would take on roles that may be hybrids of the slave nodes 220, 230, 240 or coordinator node 250 as described herein. For ease of explanation, however, the embodiments disclosed herein will be described in reference to having a single level of slave nodes 220, 230, 240.

The division and assignment of agents and nodes may introduce communication overhead that can lead (or further lead) to asynchronicity of data at the coordinator node level. That is, the coordinator node 250 is not guaranteed to receive updates from each of the agents or subsets of agents in the order that the updates were made at the agent level. In part, this is to produce high availability (or timeliness) of the statistic (referred to as a type I statistic). In a type I statistic, some skew between data sources is tolerated in order that the global aggregate reflects as many of the updates as possible, even if it means processing some of the updates out of order. According to one exemplary embodiment, growing interval statistics, such as some of the distributed aggregation statistics discussed herein, are assumed to be type I statistics, and their corresponding partial aggregates are updated as quickly as possible and reflected to the clients 260, 270.

Type II statistics differ from type I statistic in that they favor consistency (or accuracy) over timeliness. For type II statistics, updates sent from the coordinator node 250 to the client 260 may reflect a common time reference across various sources (e.g., common time period, such as a day or a particular hour), even if the individual agent or slave node updates for the same period arrive at the coordinator node at different times. That is, type II statistics are updated to reflect a consistent time for the various slave nodes and agents, and not necessarily the order that individual updates (for example, partial aggregates) work their way through the arrangement 200 of agents and nodes to the coordinator node 250. In a distributed system such as the arrangement 200, with asynchronous communication channels, the competing goals of availability (type I) and consistency (type II) represent a tension that may be decided, for example, by the client requesting the information or any other mechanism conventional in the art.

Exemplary embodiments of the present invention provide an aggregation system and method configured to satisfy both types of clients for distributed aggregation statistics over a growing interval. For example, during an interval (i.e., during the current interval), high availability is maintained by reflecting any update that reaches the coordinator node 250 as quickly as possible to the clients 260 and 270. At the expiration of the current interval, however, and the start of the next interval (i.e., crossing the boundary and entering the boundary period), consistency is maintained during the boundary period by not reflecting any more updates of the current interval to the client 260 (for example, not reporting any more global aggregates to the client 260) until the last such update is received by the coordinator node 250.

Rather, in one exemplary embodiment, such updates for the current interval continue to be aggregated (and not reported) at the coordinator node 250 during the boundary period. In one exemplary embodiment, the updates may be queued (for example, at the data source, slave node, aggregation service, or the like) during the boundary period until a final statistic for the growing interval is ready to be aggregated. In addition, in one exemplary embodiment, updates for the next interval are aggregated separately and not reported until the current interval reports its final aggregate (that is, not until after the boundary period), where the final aggregate is configured to reflect a consistent aggregate over, for example, the entire current interval for all of the agents. The next interval then becomes the current interval, the boundary period ends, and any partial aggregates are combined at the coordinator node 250 for reporting the running aggregate to the clients 260 and 270 in a high availability manner until the end of the (new) current interval is reached.

Exemplary embodiments of the present invention also provide an aggregation system and method configured to satisfy both types of clients for distributed aggregation statistics over a sliding interval. For example, parameters such as the pane size P and the number of delay panes D can be set to strike the appropriate balance between timeliness and consistency, with smaller values of pane size P or number of delay panes D improving the availability (type I) quality of the aggregated statistic, and larger values improving the consistency (type II) quality of the aggregated statistic over the sliding window. For example, setting the pane size P to be small, such as 3 seconds, while setting the number of delay panes D to be small, such as 0, may help create a highly available aggregate statistic (type I) that may report smaller than accurate values because it may not reflect the most recent updates.

FIG. 3A is a graphical representation of the aggregation of a statistic over a growing interval across one coordinator node 250 and three slave nodes 220, 230, 240 according to an embodiment of the present invention.

Referring to FIG. 3A, the current interval is labeled $I_n$, the next interval is labeled $I_{n+1}$, and the previous interval is labeled $I_{n-1}$. Consecutive intervals are separated by an interval boundary (or boundary, for short). Four separate graphs are provided as an example, one for each slave node 220, 230, 240 and one for the coordinator node 250 (which may also be aggregating the statistic with its own subset of agents, in addition to managing the three slave nodes 220, 230, 240). Each graph represents time via an x-axis that advances from left to right, and partial aggregates (for example, counts or sums) via a y-axis.

In the example graphs, the partial aggregates increment over time within the interval. For example, growing partial aggregates over the current interval $I_n$ for slave node 220 is represented via graph 310. In a similar fashion, the growing partial aggregates for slave nodes 230 and 240 are respectively represented via graphs 320 and 330. The partial aggregate for the subset of agents managed by the coordinator node 250 is represented via graph 340. Graph 350 (which includes portion 340) depicts a global aggregate (for example, sum) over all the nodes 220-250. In this example, the aggregates reflected via graphs 310-350 are reset at the boundaries between intervals, such as between $I_{n-1}$ and $I_n$, or between $I_n$, $I_{n+1}$ and Boundary periods (as shown for the coordinator node 250) represent periods of time at the completion of one interval and the early portion of the following interval where the coordinator node 250 is concurrently working on completing processing for one interval (the current interval) while starting processing for the next interval.

Figure 3B:
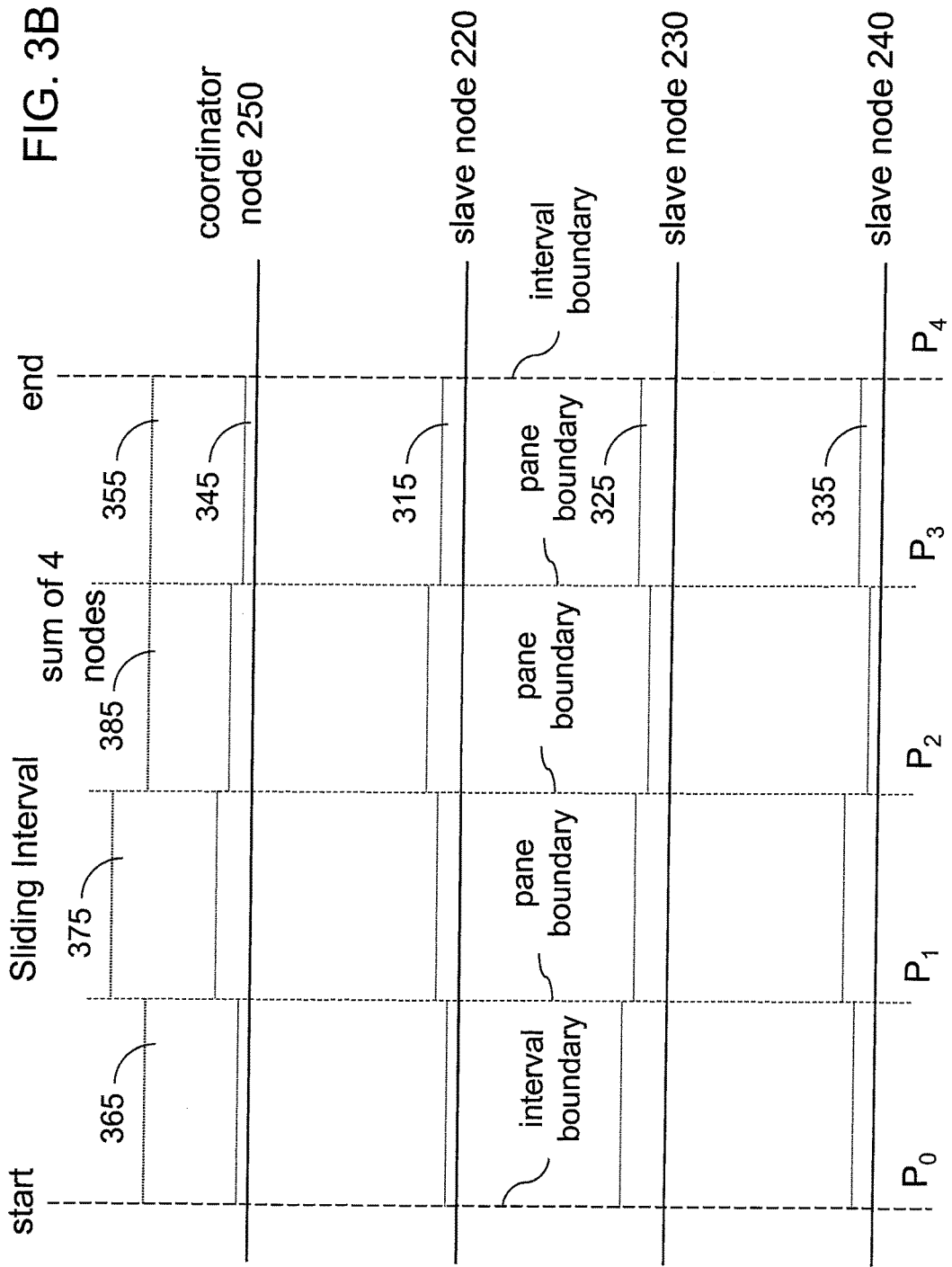
FIG. 3B is a graphical representation of the aggregation of a statistic over a sliding interval across one coordinator node and three slave nodes, according to an embodiment of the present invention.

FIG. 3B is a graphical representation of an exemplary aggregation of a statistic over a sliding interval across one coordinator node 250 and three slave nodes 220, 230, 240 according to an embodiment of the present invention.

Referring to FIG. 3B, the growing interval in the illustrated example contains 4 panes (i.e., N=4), labeled $P_0$, $P_1$, $P_2$, and $P_3$, with a next pane labeled $P_4$. For simplicity, rings are not depicted in FIG. 3B. Four separate bar graphs are provided as an example, one for each slave node 220, 230, 240 and one for the coordinator node 250 (which may also be aggregating the statistic with its own subset of agents, in addition to managing the three slave nodes 220, 230, 240). Each bar graph represents time via an x-axis that advances from left to right, and partial aggregates (for example, counts or sums) via a y-axis.

In the example bar graphs, the partial aggregates are represented as discrete sums (bars) within each pane. For example, the partial aggregate over the pane $P_3$ for slave node 220 is represented via bar graph 315. In a similar fashion, the partial aggregates for slave nodes 230 and 240 over the same pane $P_3$ are respectively represented via bar graphs 325 and 335. The partial aggregate for the subset of agents managed by the coordinator node 250 is represented via bar graph 345. Bar graph 355 (which includes the portion 345) depicts a global aggregate (for example, sum) over all the nodes 220-250 for the pane $P_3$. In this example, the aggregates reflected via bar graphs 315-355 are reset at the boundaries between panes, such as between $P_3$ and $P_4$ or between $P_4$ and $P_5$ (not shown). Aggregates over the entire sliding interval (panes $P_0$ through $P_3$) may be obtained by aggregating the corresponding global aggregates for each of the panes $P_0$ through $P_3$, namely, bar graphs 365, 375, 385, and 355, respectively. Once time passes the pane $P_3$, the sliding interval advances one pane to the right, dropping pane $P_0$ and adding pane $P_4$.

An exemplary process flow of the distributed aggregation statistics over a growing interval will now be described with reference to FIGS. 4-9. Each of the processes may be described in terms of a software routine executed by one or more processors based on computer program instructions stored in memory. A person of skill in the art should recognize, however, that the routine may be executed via hardware, firmware (e.g. via an ASIC), or in combination of software, firmware, and/or hardware. Furthermore, the sequence of steps of the process is not fixed, but may be altered into any desired sequence as recognized by a person of skill in the art.

Figure 4:
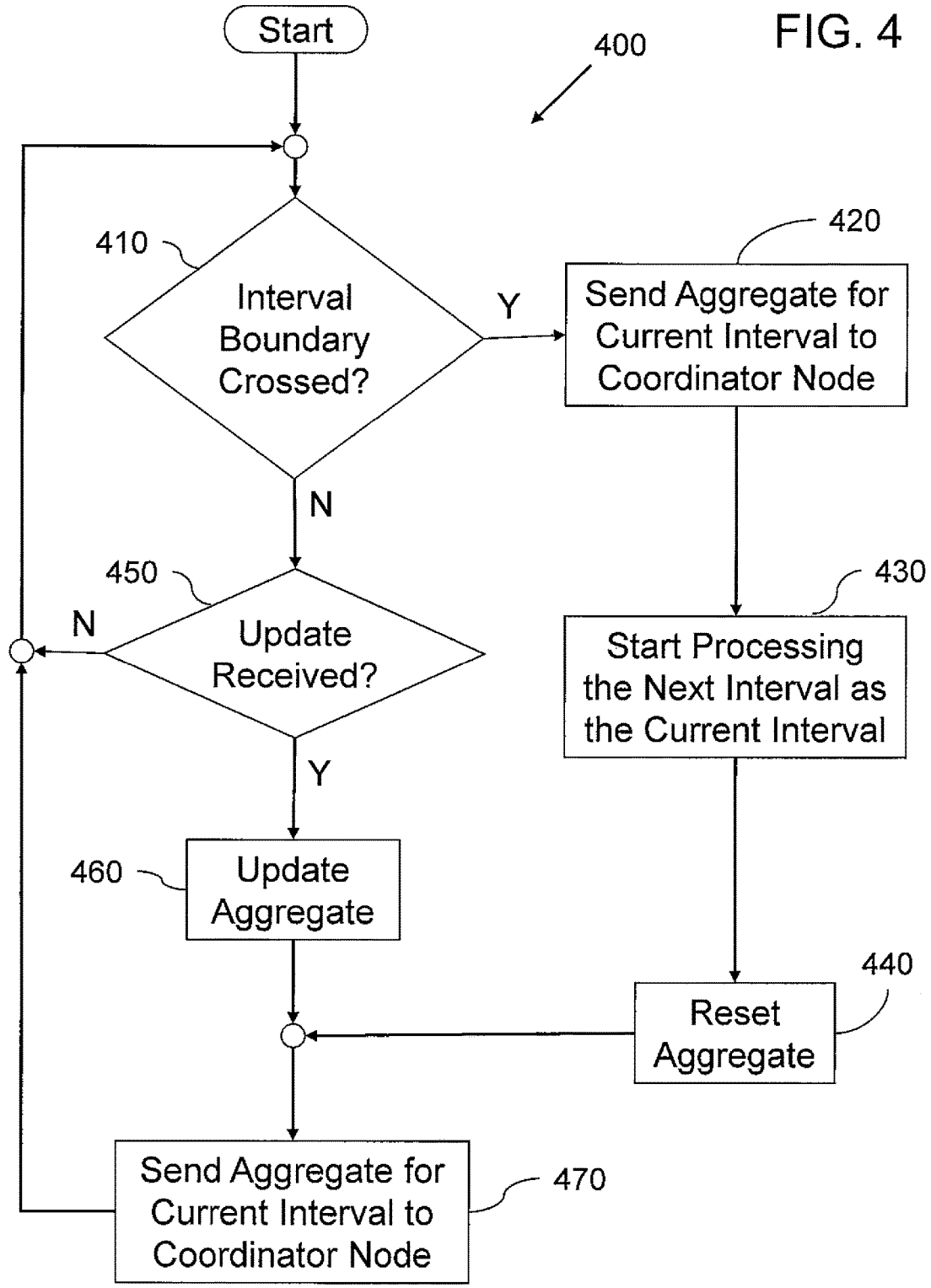
FIG. 4 is a flowchart of a process executed by a slave node for processing the distributed aggregation statistic on the growing interval according to an exemplary embodiment of the present invention.

FIG. 4 is a flowchart of a process 400 executed by the slave node 220, 230, 240 for processing the distributed aggregation statistic on the growing interval according to an exemplary embodiment of the present invention. A person of skill in the art should also recognize that the process might also be implemented by the coordinator node 250 performing the role of a slave node in addition to its role of a coordinator node 250. For ease of description, slave node 220 will described as a representative slave node.

According to one exemplary embodiment, the slave node 220 is responsible for maintaining a running, partial aggregate for the statistics that it collects over a current, growing interval corresponding to a subset of agents managed by the slave node 220. Processing begins, and in step 410, the slave node 220 determines whether an interval boundary has just been crossed, signaling the end of the current interval (e.g., no more updates are aggregated into the running partial aggregate) and the start of a boundary period. For example, the slave node 220 may receive a boundary crossed signal at a consistent time (such as at midnight), and the receipt of the signal may be an indication to the slave node 220 that it should conclude processing for the current interval and switch processing to the next interval. For instance, in one embodiment, the coordinator node 250 may send such a signal, while in another embodiment, a timer (such as a global timer) may trigger the signal.

According to one exemplary embodiment, crossing an interval boundary causes any new updates from the agents to be aggregated into a next interval. However, existing updates whose corresponding partial aggregates may still be working their way to the coordinator node 250 are aggregated as part of a current interval. According to one exemplary embodiment, the slave node 220 crosses the boundary in step 410 only once per interval, regardless of how many times step 410 is performed.

If the slave node 220 has determined that the boundary has been crossed, the slave node 220 transmits the current interval's final aggregate to the coordinator node 250 in step 420. This allows the coordinator node 250 to see a final aggregate from the slave node 220 for the current interval.

In step 430, the slave node 220 sets the next interval to be the current interval (i.e., starts processing the next interval as the current interval). Thus, subsequent updates received from the agents are aggregated into the next interval. In one exemplary embodiment, the nodes identify each interval uniquely (i.e., an interval identifier), such as with a date or time stamp, or with a counter incrementing from zero. This allows updates for a statistic to be tied to the correct interval (e.g., to keep the global aggregate consistent). Step 430 can also serve as an entry point for an initialization routine for the slave node 220, where the slave node 220 initializes the current interval. For example, the slave node 220 may set the current interval (e.g., interval identifier) to the current date or time, or set it to zero.

In step 440, the slave node 220 resets its running partial aggregate for the current interval (for example, the slave node 220 may set the running partial aggregate to NULL, indicating an empty aggregate). In step 470, the slave node 220 sends its reset (e.g., NULL) aggregate to the coordinator node 250. The interval identifier associated with the transmitted aggregate is for the next interval, signaling to the coordinator node 250 that the slave node 220 is finished transmitting updates for the current interval, and has started transmitting updates for the next interval. Processing then repeats, starting with step 410, checking for boundary crossing (i.e., of the next interval).

If, on the other hand, in step 410, the slave node 220 has determined that the interval boundary has not been crossed, processing proceeds to step 450, where the slave node 220 checks to see if it has received an update from any of its agents. For ease of description, in the slave node routine 400, the updates from the agents are described as being simple values, not aggregates. If no update has been received, the slave node 220 loops back to step 410 for determining whether the interval boundary has been crossed.

If the slave node 220 has received an update from one of its agents, processing proceeds to step 460, where the slave node 220 updates the running partial aggregate for the current interval with the new value from the agent. The new value may be, for example, a count request (i.e., increment a counter by one, as might happen when the agent completes a call), or a number (e.g., a number of minutes of the just completed call by the agent). In step 470, the slave node 220 sends the updated partial aggregate for the current interval to the coordinator node 250. According to one exemplary embodiment, the partial aggregate includes a count (such as a call count), or a running sum (such as a running total of the number of minutes for the calls), or the maximum length of a call, or the like. The slave node 220 may send the interval identifier with the partial aggregate (e.g., to keep it consistently aggregated at the coordinator node 250 with other data from the same interval). In this manner, updates are reported with high availability, specifically, an updated partial aggregate is reported to the coordinator node 250 as soon as the update is received from an agent. Processing then repeats, starting with step 410, checking for interval boundary crossing.

FIG. 5 is a flowchart of a process 500 executed by the coordinator node 250 for processing the distributed aggregation statistic on the growing interval according to an exemplary embodiment of the present invention. According to one exemplary embodiment, the coordinator node 250 is responsible for maintaining a running partial aggregate for a particular statistic over a current, growing interval for each of the slave nodes 220, 230, 240 (as well as for the coordinator node 250, if it is also acting as a slave node). For ease of description, the process 500 depicts the coordinator node's 250 role as coordinating all of the partial aggregates, and not the possible additional role as another slave node. In addition, an individual slave node will be described in reference to slave node 220, while the group of slave nodes will be described in reference to slave nodes 220, 230, 240. In a similar fashion, an individual client will be described in reference to client 260, while the group of clients will be described in reference to clients 260, 270.

Processing begins and in step 510, the coordinator node 250 determines whether a current interval boundary has been crossed and thus, a boundary period has been entered. According to one exemplary embodiment, the crossing of a boundary signals the coordinator node 250 that the boundary period has been entered, and that a final aggregate for the current interval should be determined and forwarded to the clients 260, 270. In one exemplary embodiment, the coordinator node 250 maintains partial state records (e.g., partial aggregates of the statistic) for each of the slave nodes 220, 230, 240 (and the coordinator node 250, if also functioning as a slave node), for both the current and next intervals. During the boundary period, partial aggregate updates for the current interval may continue to be received and processed by the coordinator node 250. In addition, each slave node 220 may send a final updated partial aggregate for its subset of agents when it crosses the interval boundary. Accordingly, the coordinator node 250 may be required to process running partial aggregates from the slave nodes 220, 230, 240 over both the current interval and the next interval during the boundary period.

In step 510, if the current interval has expired, processing proceeds to step 520, where some indication is made (such as setting a boundary period flag) that the boundary period has been entered, but not completed. In one exemplary embodiment, in response to entering the boundary period, further reporting of updated running aggregates of the statistic to the clients 260, 270 is suspended until a final aggregate for the current interval is accounted for and reported to the clients 260, 270, thus signifying an end of the boundary period. In this manner, consistency of the statistic is favored over availability during the boundary period. For ease of description, the remainder of the application will be described in reference to the boundary period being tracked by the coordinator node 250 using a boundary period flag that is set when the boundary period is entered and reset when the boundary period is exited.

In step 530, the coordinator node 250 checks each of the slave nodes 220, 230, 240 for completion of the current interval. According to one exemplary embodiment, a slave node 220 signals completion of a current interval by transmitting an updated partial aggregate for a next interval. Thus, the coordinator node 250 examines the interval identifier for the updated partial aggregate for determining whether it is for the current or next interval. According to one exemplary embodiment, the coordinator node 250 maintains a set of flags (current interval completed flags), one flag for each slave node 220, to track whether a slave node 220 has completed the current interval. If the coordinator node 250 determines based on the interval information associated with the received partial aggregates that each of the slave nodes 220, 230, 240 has completed its current interval processing, processing proceeds to step 580 for exiting the boundary period (e.g., resetting the current interval and making the next interval be the current interval).

Referring again to step 530, if not all of the slave nodes 220, 230, 240 have completed their processing for the current interval, processing proceeds to step 540 and a (boundary period timeout) timer is set for time T, after which a forced exiting of the boundary period takes place. T, for example, can be a set length (such as a predetermined length) of time for the boundary period. Step 540 can thus guarantee an end of the boundary period, should the boundary period not end for other reasons (such as every slave node 220, 230, 240 having started reporting partial aggregates for the next interval). The timer can be checked in any one of many ways, as would be apparent to one of ordinary skill in the art, such as setting an interrupt handler, checking the timer manually at one or more of the decision points that are routinely executed (such as step 510), or the like.

In one exemplary embodiment, the coordinator node 250 determines the boundary period timeout value T based on factors such as the number of slave nodes, the length of time of the intervals, the speed of communication between the nodes, or the like. In another exemplary embodiment, T is always fixed at 10 seconds. According to one example, T is much shorter than the interval length, and allows for a reasonable time for all of the slave nodes 220, 230, 240 to transmit their final partial aggregates for the current interval to the coordinator node 250. For example, T might be 10 seconds while an interval may be a 24-hour period, or T might be 3 seconds while an interval is a five-minute period.

Referring again to step 510, if the current interval has not expired, processing proceeds to step 550, where the coordinator node 250 checks to see if it has received an updated partial aggregate from any of its slave nodes 220, 230, 240. If no update has been received, the coordinator node 250 returns to step 510. If an update has been received, the updated partial aggregate is processed in step 560.

Figure 6A:
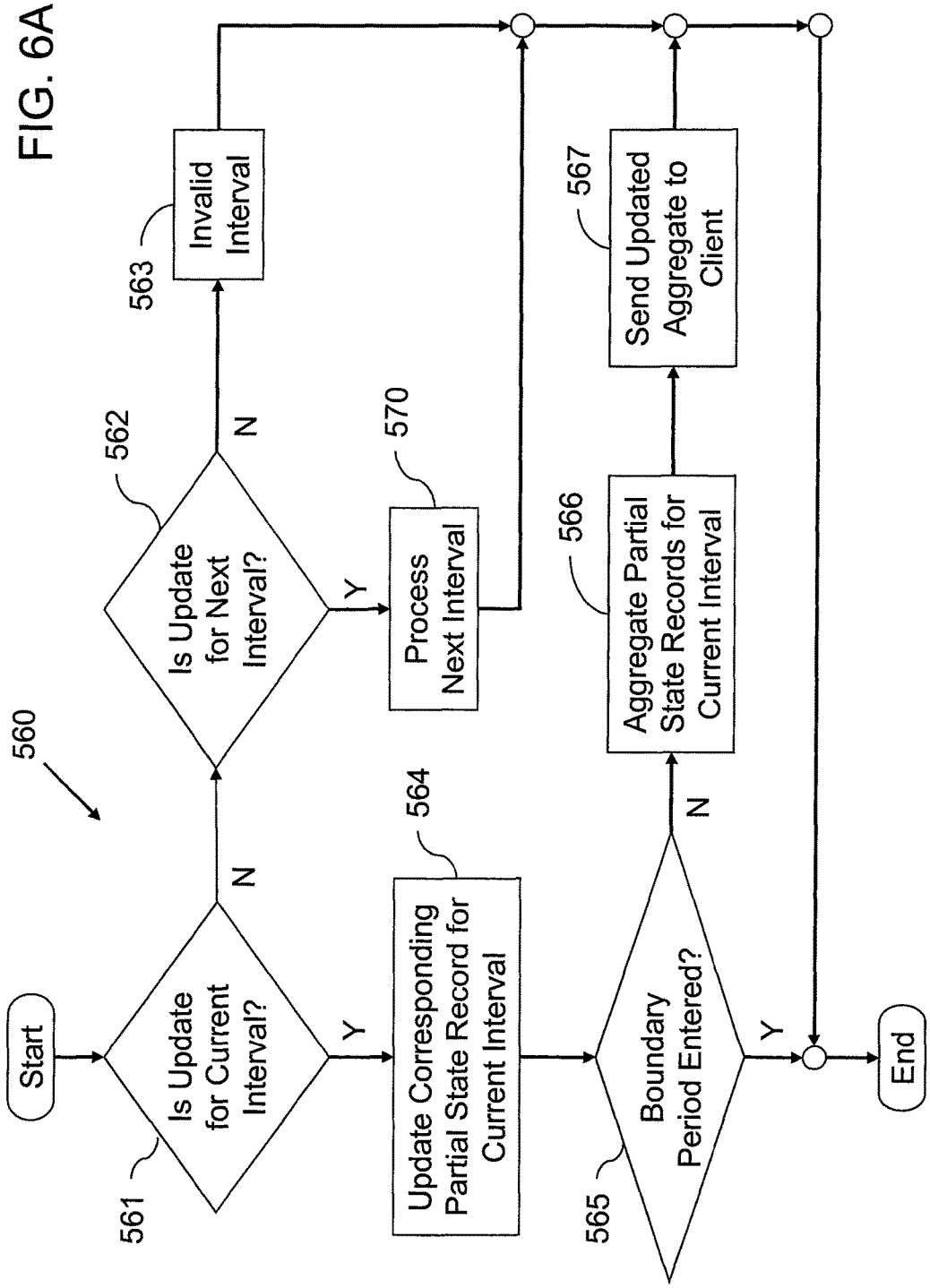
FIGS. 6A and 6B are more detailed flow diagrams of steps executed by the coordinator node for processing an updated partial aggregate of the distributed aggregation statistic on the growing interval received from a slave node according to an exemplary embodiment of the present invention.
Figure 6B:
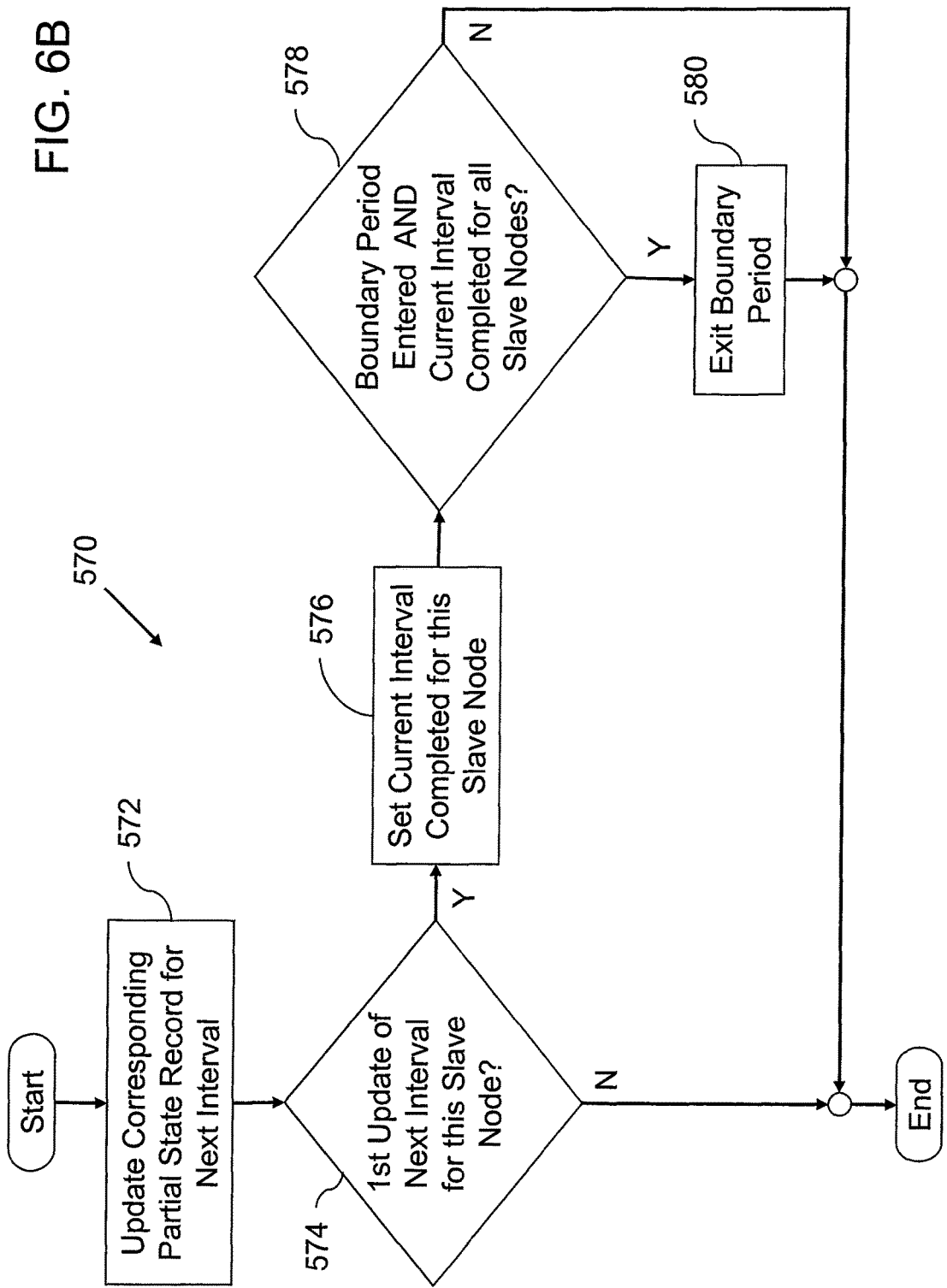

FIGS. 6A and 6B are more detailed flow diagrams of steps 560 and 570 executed by the coordinator node 250 for processing an updated partial aggregate of the distributed aggregation statistic on the growing interval received from a slave node 220 according to an exemplary embodiment of the present invention.

Processing begins and in step 561, the coordinator node 250 examines the received partial aggregate and determines whether the interval identifier included with the aggregate identifies the current interval. If not, in step 562, the coordinator node 250 determines whether the interval identifier identifies a next interval. If not, the coordinator node 250 determines, in step 563, that the identified interval is invalid. In this case, the coordinator node 250 takes some appropriate action, e.g., the update may be discarded, the condition may be reported to an appropriate process or person, and/or other similar actions may be taken. This event (i.e., an updated partial aggregate being associated with an invalid interval) can take place if, for example, the partial aggregate reaches the coordinator node 250 after expiration of the boundary period timeout time T Referring again to step 561, if the updated partial aggregate is for the current interval, then in step 564, the coordinator node 250 updates its partial state record for the current interval for the corresponding slave node 220 in step 564. For example, the coordinator node 250 may replace a previous partial aggregate for the slave node 220 with the newly updated partial aggregate and store the aggregate in a partial state record.

In step 565, the coordinator node 250 checks whether if the boundary period has been entered. If so, the coordinator node 250 operates in a consistency mode and does no further updated partial aggregate processing. Otherwise, the coordinator node 250 operates in availability mode and in step 566, all of the partial state records (e.g., the most recent updated partial aggregate from each slave node 220) are aggregated to produce a running aggregate for the agent-group. This updated running aggregate is then reported to the client 260 in step 567 (in keeping with high availability), after which the coordinator routine ends.

Referring to FIG. 6B, if the updated partial aggregate is for the next interval, then processing proceeds to step 570, where the coordinator node 250 has received an updated partial aggregate from one of the slave nodes 220, this time for the next interval. Accordingly, in step 572, the coordinator node 250 updates its partial state record for the next interval for the corresponding slave node 220 (e.g., replace the previous partial aggregate for the slave node 220 with the newly updated value). In one exemplary embodiment, the coordinator node 250 maintains a set of flags, one for each slave node 220, indicating if the slave node 220 has completed processing the current interval and started processing the next interval. Accordingly, in step 574, the coordinator node 250 checks to see if just completed update is the first update from this slave node 220 for the next interval (i.e., has the coordinator node 250 set the current interval completed for this slave node 220). If this update is not the first update, then processing ends for the coordinator node 250, noting that the running aggregate for the next interval does not have to be reported to the client 260, as reporting has not completed for the current interval.

If, however, this is the first update of the next interval for this slave node 220, then processing continues to step 576, where the current interval completed flag for the slave node 220 is set. Then, in step 578, the coordinator node 250 sees if the boundary period has been entered and if every slave node 220, 230, 240 has completed sending updates for the current interval (i.e., sees if the boundary period can now be exited). If not, then processing for the coordinator node routine ends. Otherwise, processing continues to step 580, and the boundary period of the current interval is exited (for the coordinator node 250 to complete processing the current interval and start processing the next interval), after which the coordinator node routine ends.

Figure 7:
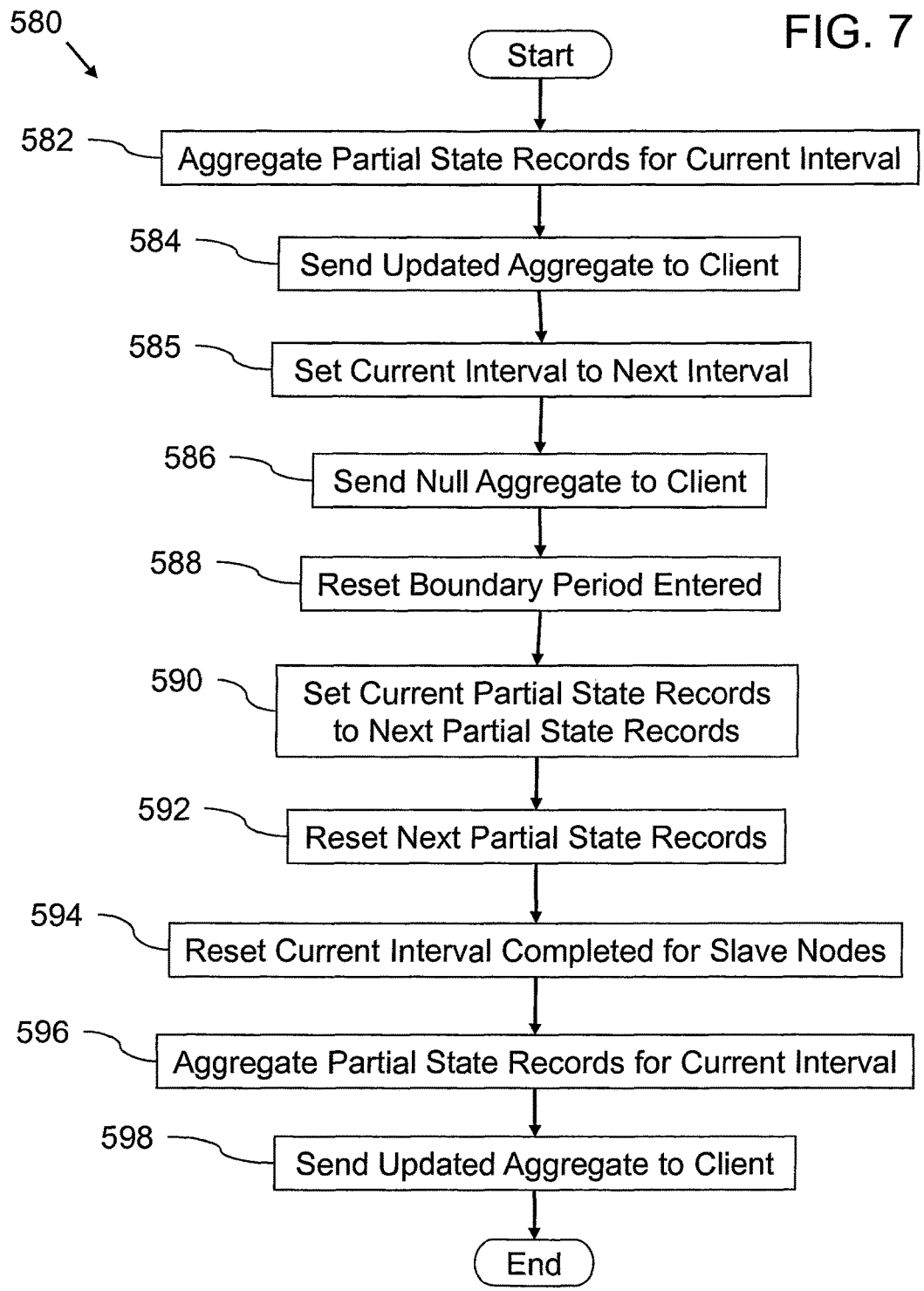
FIG. 7 is a flowchart of a process executed by the coordinator node for exiting a boundary period of the current interval for the distributed aggregation statistic on the growing interval according to an exemplary embodiment of the present invention.

FIG. 7 is a flowchart of a process 580 executed by the coordinator node 250 for exiting a boundary period of the current interval for the distributed aggregation statistic on the growing interval according to an exemplary embodiment of the present invention.

In the process 580, the coordinator node 250 resets the current interval, making the next interval the new current interval. Processing begins and in step 582, the (final) partial state records for the current interval from each of the slave nodes 220, 230, 240 are aggregated to produce a final running aggregate for the current interval. This final aggregate represents a consistent value over the entire current interval. Accordingly, in step 584, this final updated aggregate for the current interval is reported to the client 260 (to maintain the consistency mode processing between intervals). In step 585, the current interval is set to the next interval (e.g., advances one day, or increments by one). In step 586, a null aggregate is sent to the client. This signifies the end of the current interval, where the previous value that was sent representing the aggregated statistic over the entire current interval). In step 588, the boundary period flag is reset.

In step 590, the partial state records (which are maintained at the coordinator node 250 in one exemplary embodiment) for the current interval are initialized to the partial state records for the next interval, for each of the slave nodes 220, 230, 240. The partial state records for the next interval are then reset in step 592. This preserves consistency of data across the different intervals. In step 594, the current interval completed flags (which are maintained at the coordinator node 250 in one exemplary embodiment)) are reset for each of the slave nodes 220, 230, 240. In step 596, availability mode resumes with the aggregation of the partial aggregates from each of the slave nodes 220, 230, 240 for the (now) current interval. This new updated running aggregate is then sent to the client 260 in step 598, and the boundary period for the coordinator node 250 is exited.

While not separately described, the boundary period exiting routine 580 is similar (for example, could share the most of the same steps) to a routine for initializing the coordinator node 250. In one exemplary embodiment, the coordinator node 250 enters the boundary period exiting routine 580 at step 585 to perform the initialization for the coordinator node 250.

An exemplary process flow of the distributed aggregation statistics over a sliding interval will now be described with reference to FIGS. 8-9. Each of the processes may be described in terms of a software routine executed by one or more processors based on computer program instructions stored in memory (e.g., by a computer device). A person of skill in the art should recognize, however, that the routine may be executed via hardware, firmware (e.g. via an ASIC), or in combination of software, firmware, and/or hardware. Furthermore, the sequence of steps of the process is not fixed, but may be altered into any desired sequence as recognized by a person of skill in the art.

Figure 8:
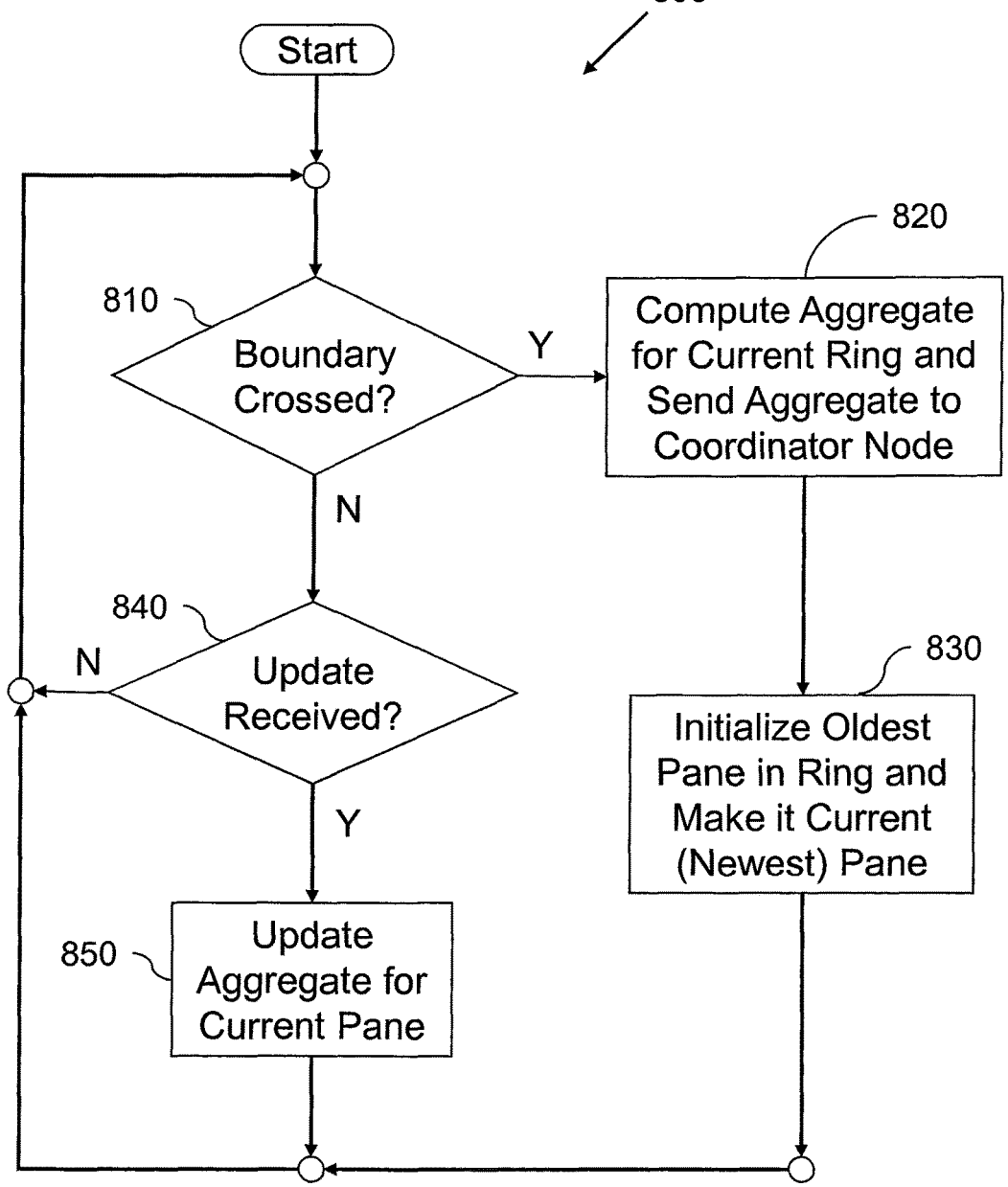
FIG. 8 is a flowchart of a process executed by a slave node for processing the distributed aggregation statistic on the sliding interval according to an exemplary embodiment of the present invention.

FIG. 8 is a flowchart of a process 800 executed by the slave node 220, 230, 240 for processing a distributed aggregation statistic on a sliding interval according to an exemplary embodiment of the present invention. A person of skill in the art should recognize that the process may also be implemented by the coordinator node 250 performing the role of a slave node in addition to its role of a coordinator node 250. For ease of description, slave node 220 will be described as a representative slave node.

According to one exemplary embodiment, the slave node 220 is responsible for maintaining a running, partial aggregate for the statistics that it collects over a ring of G most recent panes. In some exemplary embodiments, the slave node 220 may be responsible for maintaining a running partial aggregate over a different period of time, such as a pane or an entire sliding window. The slave node 220 collects and aggregates the corresponding updates of the subset of agents it manages. As described above, doing the aggregation in a multi-level approach, such as with rings and panes, with slave nodes 220, 230, 240 doing the pane-level aggregation into each ring, and the coordinator node 250 doing the ring-level aggregation into the sliding interval, may help distribute the aggregation more evenly among the nodes and help prevent or lessen the likelihood of a serial bottle neck at the coordinator node 250. In this regard, each slave node 220 maintains a queue of length G representing the G most recent panes (one partial aggregate per pane), for example, one ring.

Processing begins, and in step 810, the slave node 220 determines whether a pane boundary has been crossed, signaling the end of the current pane (e.g., no more updates are aggregated into the running partial aggregate for the current pane) and the start of a new pane. For example, the slave node 220 may receive a pane boundary crossed signal at a consistent time (such as at every 10 seconds), and the receipt of the signal may be an indication to the slave node 220 that it should conclude processing for the current pane and switch processing to the next pane. For instance, in one embodiment, the coordinator node 250 may send such a signal, while in another embodiment, a timer (such as a global timer) may trigger the signal.

According to one exemplary embodiment, crossing a pane boundary causes any new updates from the agents to be aggregated into a next pane. However, existing updates whose corresponding partial aggregates may still be working their way to the coordinator node 250 are aggregated as part of a current (or previous) pane. According to one exemplary embodiment, the slave node 220 crosses the boundary in step 810 only once per pane, regardless of how many times step 810 is performed. For ease of description, the process flow of FIGS. 8-9 will hereinafter be described in terms of a slave node 220 basing the time of an update from an agent with respect to the receipt time of the update by the slave node 220.

If the slave node 220 has determined that the boundary has been crossed, the slave node 220 computes and transmits the current ring's final aggregate to the coordinator node 250 in step 820. According to one example, the final aggregate is the aggregate of the G partial aggregates for the corresponding last G panes that the slave node 220 stores in its queue. This allows the coordinator node 250 to see a final aggregate from the slave node 220 for the current ring.

In step 830, the slave node 220 deletes the oldest (e.g., the Gth oldest) pane in the ring by initializing (e.g., clearing, setting to NULL, etc.) its partial aggregate and making it be the newest pane in the ring. Thus, subsequent updates received from the agents are aggregated into this newest pane, which is now the Current pane.

In one exemplary embodiment, the nodes identify each pane uniquely (e.g. via a pane identifier), such as with a date or time stamp (representing, for example, the end time E of the ring, so that the ring encompasses the time from E R to E, where R represents the ring size in units of time), or with a counter incrementing from zero. This allows updates for a statistic to be tied to the correct pane (e.g., to keep the global aggregate for the current ring consistent). Step 830 may also serve as an entry point for an initialization routine for the slave node 220, where the slave node 220 initializes the current pane. For example, the slave node 220 may set the current pane (e.g., pane identifier) to the current date or time, or set it to zero. Processing then repeats, starting with step 810, checking for boundary crossing (of the next pane).

Referring again to step 810, if the slave node 220 determines that the pane boundary has not been crossed, processing proceeds to step 840, where the slave node 220 checks to see if it has received an update from any of its agents. For ease of description, in the slave node routine 800, the updates from the agents are described as being simple tuples (for example, a value capable of being aggregated into an aggregated statistic). If no update has been received, the slave node 220 loops back to step 810 for determining whether the pane boundary has been crossed.

If the slave node 220 has received an update from one of its agents, processing proceeds to step 850, where the slave node 220 updates the running partial aggregate for the current pane with the new value from the agent. The new value may be, for example, a count request (e.g., increment a counter by one, as might happen when the agent completes a call), or a number (e.g., a number of minutes of the just completed call by the agent). Processing then repeats, starting with step 810, checking for pane boundary crossing.

FIG. 9 is a flowchart of a process 900 executed by the coordinator node 250 for processing the distributed aggregation statistic on the sliding interval according to an exemplary embodiment of the present invention. According to one exemplary embodiment, the coordinator node 250 is responsible for maintaining a running global aggregate for a particular statistic for each of a set of rings that make up a sliding interval for the slave nodes 220, 230, 240 (as well as for the coordinator node 250, if it is also acting as a slave node). In some embodiments, the partial aggregates maintained at the coordinator node 250 may encompass other groupings, such as by individual slave node, or by pane, or by sliding interval, as would be apparent to one of ordinary skill in the art. For ease of description, the process 900 depicts the coordinator node's 250 role as coordinating all of the partial aggregates for each ring that may contribute to a statistic that may need to be reported to a client 260, and not the possible additional role as another slave node. In addition, an individual slave node will be described in reference to slave node 220, while the group of slave nodes will be described in reference to slave nodes 220, 230, 240. In a similar fashion, an individual client will be described in reference to client 260, while the group of clients will be described in reference to clients 260, 270.

Processing begins, and in step 910, the coordinator node 250 determines whether a current pane boundary has been crossed (i.e., if the current pane has expired). According to one exemplary embodiment, the crossing of a boundary signals that a final aggregate for a sliding interval (for example, the current sliding interval) should be determined and forwarded to the clients 260, 270. In one exemplary embodiment, the coordinator node 250 maintains partial state records (e.g., partial aggregates of the statistic) for the rings that make up the sliding intervals that may still need to be reported. That is, the coordinator node 250 maintains a queue (e.g., circular array) of ring PSR's, ordered from oldest to newest. For example, the coordinator node 250 may maintain ring PSRs going back to the oldest ring making up a sliding interval that may be reported to a client 260, and going forward to the next ring (after the current ring), in case one of the slave nodes 220 sends an update for the next ring before the coordinator node 250 has a chance to finish the current ring. Each slave node 220 may send a final updated partial aggregate for its subset of agents when it crosses the pane boundary. Accordingly, the coordinator node 250 may process partial aggregates from the slave nodes 220, 230, 240 that collectively span many rings or panes.

In step 910, if the current pane has just expired, processing proceeds to step 920, where the statistic over the sliding interval of interest (considering the number of delay panes D) is aggregated from its constituent ring PSRs (for example, aggregating M separate ring PSRs spaced R apart and ending at the current pane minus the number of delay panes D). This global aggregate for the sliding interval of interest is then reported to the clients 260, 270. In step 930, the oldest ring PSR in the queue is initialized (e.g., cleared, set to NULL, etc.) and made to be the newest ring PSR. In addition, the next ring is made the current ring. Processing then repeats, starting with step 910 (checking for pane boundary crossing, only this time for the next pane).

Referring again to step 910, if the current pane has not expired, processing proceeds to step 940, where the coordinator node 250 checks to see if it has received a partial aggregate for a ring from one or more of its slave nodes 220, 230, 240. If no update has been received, the coordinator node 250 returns to step 910. If an update has been received, the coordinator node 250 checks in step 950 to see if the ring aggregate corresponding to the update is currently being maintained in the queue of ring PSRs. This check helps prevent errant or stray ring updates from corrupting the aggregates for the active rings being processed. According to one exemplary embodiment, the coordinator node 250 ignores such aberrant updates (and returns to step 910). In one exemplary embodiment, the coordinator node 250 may take a different action, such as alerting an operator of the stray communication or the like. If the update is for a valid ring, processing proceeds to step 960, where the PSR for the corresponding ring is updated by aggregating the existing PSR with the update. Processing then returns to step 910.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for aggregating and reporting data from a plurality of data sources associated with a contact center, the method comprising:
   maintaining, by a computer device, aggregated data for a sliding interval comprising N+1 contiguous panes, wherein N is greater or equal to 1, each of the panes having a first time interval;
   receiving, by the computer device, data collected by a first node of a plurality of nodes and a second node of the plurality of nodes, each of the first and second nodes collecting respectively first and second portions of the data from respectively a first plurality and a second plurality of data sources over a preset time period;
   updating, by the computer device, the aggregated data for the sliding interval based on the collected data received from the first and second nodes;
   monitoring, by the computer device, for expiration of the Nth pane;
   determining, by the computer device, that the first time interval of the Nth pane has expired;
   identifying, by the computer device at least one delay pane having a second time interval;
   in response to determining that the first time interval for the Nth pane has expired, and further in response to identifying at least one delay pane, delaying, for a duration of the second time interval, reporting the aggregated data for the sliding interval to a client for improving consistency of data provided to the client; and
   transmitting to the client over a data communications network, by the computer device, in response to expiration of the second time interval, the aggregated data for the sliding interval.

2. The method of claim 1, wherein:
the contiguous panes further comprise D contiguous panes ordered from N+1 to N+D, wherein D is greater than or equal to 1;
the maintaining of the aggregated data for the sliding interval further comprises maintaining aggregated data for additional sliding intervals of N+1 contiguous panes ordered from I to I+N for each I between 1 and D; and
the one of the panes is the (N+D)th pane.

3. The method of claim 2 further comprising dividing each of the sliding interval and the additional sliding intervals into R+1 contiguous rings ordered from 0 to R, each of the rings comprising G+I of the panes, wherein R and G are each greater than or equal to 1, and N+1=(R+1)×(G+1).

4. The method of claim 3, wherein each of the updates comprises a partial aggregate of the data representing one of the rings.

5. The method of claim 4, wherein the maintaining of the aggregated data for the sliding interval and the additional sliding intervals comprises maintaining the aggregated data for each of the rings.

6. The method of claim 1 further comprising dividing the sliding interval into R+1 contiguous rings ordered from 0 to R, each of the rings comprising G+1 of the panes, wherein R and G are each greater than or equal to 1, and N+1=(R+1)×(G+1).

7. The method of claim 6, wherein the G+1 of the panes comprise G+1 contiguous ones of the panes ordered from M to M+G for some value of M between 0 and N−G.

8. The method of claim 6, wherein each of the updates comprises a partial aggregate of the data representing one of the rings.

9. The method of claim 8, wherein the maintaining of the aggregated data for the sliding interval comprises maintaining the aggregated data for each of the rings.

10. The method of claim 1, wherein the first time interval is equal to the second time interval.

11. A system comprising:
a computer device; and
a non-transitory physical medium, wherein the medium has instructions stored thereon that, when executed by the computer device, cause the computer device to:
maintain aggregated data for a sliding interval comprising N+1 contiguous panes, wherein N is greater or equal to 1, each of the panes having a first time interval;
receive data collected by a first node of a plurality of nodes and a second node of the plurality of nodes, each of the first and second nodes collecting respectively first and second portions of the data from respectively a first plurality and a second plurality of data sources over a preset time period;
update the aggregated data for the sliding interval based on the collected data received from the first and second nodes;
monitor for expiration of the Nth pane;
determine that the first time interval of the Nth pane has expired;
identify at least one delay pane having a second time interval;
in response to determining that the first time interval for the Nth pane has expired and further in response to identifying at least one delay pane, delay, for a duration of the second time interval, report of the aggregated data for the sliding interval to a client for improving consistency of data provided to the client; and
transmit to the client over a data communications network, by the computer device, in response to expiration of the second time interval, the aggregated data for the sliding interval.

12. The system of claim 11, wherein:
the contiguous panes further comprise D contiguous panes ordered from N+1 to N+D, wherein D is greater than or equal to 1; the coordinator data aggregation node is further configured to maintain the aggregated data for additional sliding intervals of N+1 contiguous panes ordered from I to I+N for each I between 1 and D; and the one of the panes is the (N+D)th pane.

13. The system of claim 12, wherein the instructions further cause the computer device to divide each of the sliding interval and the additional sliding intervals into R+1 contiguous rings ordered from 0 to R, each of the rings comprising G+1 of the panes, wherein R and G are each greater than or equal to 1, and N+1=(R+1)×(G+1).

14. The system of claim 13, wherein each of the updates comprises aggregated said first data representing one of the rings.

15. The system of claim 14, wherein the instructions that cause the computer device to maintain the aggregated data for the sliding interval and the additional sliding intervals comprises instructions that cause the computer device to maintain the aggregated data for each of the rings.

16. The system of claim 11, wherein the instructions further cause the computer device to divide the sliding interval into R+1 contiguous rings ordered from 0 to R, each of the rings comprising G+1 of the panes, wherein R and G are each greater than or equal to 1, and N+1=(R+1)×(G+1).

17. The system of claim 16, wherein the G+1 of the panes comprise G+1 contiguous ones of the panes ordered from M to M+G for some value of M between 0 and N−G.

18. The system of claim 16, wherein each of the updates comprises a partial aggregate of the data representing one of the rings.

19. The system of claim 18, wherein the instructions that cause the computer device to maintain the aggregated data for the sliding interval include instructions that cause the processor to maintain the third-aggregated data for each of the rings.

* * * * *